United States Patent
Fisher et al.

(10) Patent No.: US 11,869,013 B1
(45) Date of Patent: *Jan. 9, 2024

(54) SYSTEM AND METHOD FOR CARD CONTROL

(71) Applicant: Wells Fargo Bank, N.A., San Francisco, CA (US)

(72) Inventors: Jennifer A. Fisher, Belmont, CA (US); Brian M. Pearce, Pleasanton, CA (US); Steven E. Puffer, Champlin, MN (US)

(73) Assignee: Wells Fargo Bank, N.A., San Francisco, CA (US)

(*) Notice: Subject to any disclaimer, the term of this patent is extended or adjusted under 35 U.S.C. 154(b) by 422 days.

This patent is subject to a terminal disclaimer.

(21) Appl. No.: 15/862,494

(22) Filed: Jan. 4, 2018

Related U.S. Application Data

(63) Continuation of application No. 15/496,961, filed on Apr. 25, 2017, now Pat. No. 11,556,936.

(51) Int. Cl.
*G06Q 20/40* (2012.01)
*G06Q 20/42* (2012.01)
(Continued)

(52) U.S. Cl.
CPC ....... *G06Q 20/409* (2013.01); *G06Q 20/3278* (2013.01); *G06Q 20/357* (2013.01);
(Continued)

(58) Field of Classification Search
None
See application file for complete search history.

(56) References Cited

U.S. PATENT DOCUMENTS

| 5,485,510 A | 1/1996 | Colbert |
| 5,573,457 A | 11/1996 | Watts et al. |

(Continued)

FOREIGN PATENT DOCUMENTS

| CN | 102498497 A | * | 6/2012 | ............. G06Q 20/10 |
| CN | 102804219 A | * | 11/2012 | ........... G06F 16/248 |

(Continued)

OTHER PUBLICATIONS

Yang, Ming-Hour; Security Enhanced EMV-Based Mobile Payment Protocol. https://patents.google.com/scholar/15767854982483958498?q=(Security+Enhanced+EMV-Based+Mobile+Payment+Protocol)&patents=false&scholar&oq=Security+Enhanced+EMV-Based+Mobile+Payment+Protocol (Year: 2014).*

(Continued)

*Primary Examiner* — El Mehdi Oussir
(74) *Attorney, Agent, or Firm* — Foley & Lardner LLP

(57) ABSTRACT

A system and method for card control includes a card control computing system configured to enforce a card control rule based upon transactions made with a payment card. The card control computing system includes a memory unit configured to store information associated with a card control dashboard, and a processing unit configured to cause presentation of the card control dashboard via a display associated with a remote computing device, such that the card control dashboard is associated with the payment card and the card control rule. The card control dashboard includes a user interface. The processing unit is further configured to receive an input via the user interface to activate or deactivate one or more features associated with the card control rule, and trigger the card control rule based upon the one or more features that are activated or deactivated.

20 Claims, 7 Drawing Sheets

(51) Int. Cl.
*G06Q 20/34* (2012.01)
*G06Q 20/38* (2012.01)
*G06Q 20/32* (2012.01)

(52) U.S. Cl.
CPC ....... *G06Q 20/382* (2013.01); *G06Q 20/4015* (2020.05); *G06Q 20/425* (2013.01)

(56) References Cited

U.S. PATENT DOCUMENTS

| | | | |
|---|---|---|---|
| 5,737,423 A | 4/1998 | Manduley | |
| 5,999,978 A | 12/1999 | Angal et al. | |
| 6,047,268 A | 4/2000 | Bartoli et al. | |
| 6,105,006 A | 8/2000 | Davis et al. | |
| 6,188,309 B1 | 2/2001 | Levine | |
| 6,193,152 B1 | 2/2001 | Fernando et al. | |
| 6,408,330 B1 | 6/2002 | Delahuerga | |
| 6,422,462 B1 | 7/2002 | Cohen | |
| 6,494,367 B1 | 12/2002 | Zacharias | |
| 6,575,361 B1 | 6/2003 | Graves et al. | |
| 6,717,592 B2 | 4/2004 | Gusler et al. | |
| 6,845,906 B2 | 1/2005 | Royer et al. | |
| 6,865,547 B1 | 3/2005 | Brake et al. | |
| 6,879,965 B2 | 4/2005 | Fung et al. | |
| 6,931,382 B2 | 8/2005 | Laage et al. | |
| 6,980,969 B1 | 12/2005 | Tuchler et al. | |
| 7,014,107 B2 | 3/2006 | Singer et al. | |
| 7,016,877 B1 | 3/2006 | Steele et al. | |
| 7,155,411 B1 | 12/2006 | Blinn et al. | |
| 7,219,833 B2 | 5/2007 | Cantini et al. | |
| 7,225,156 B2 | 5/2007 | Fisher et al. | |
| 7,249,099 B2 | 7/2007 | Ling | |
| 7,264,154 B2 | 9/2007 | Harris | |
| 7,319,986 B2 | 1/2008 | Praisner et al. | |
| 7,331,518 B2 | 2/2008 | Rable | |
| 7,347,361 B2 | 3/2008 | Lovett | |
| 7,359,880 B2 | 4/2008 | Abel et al. | |
| 7,383,988 B2 | 6/2008 | Slonecker, Jr. | |
| 7,392,224 B1 | 6/2008 | Bauer et al. | |
| 7,398,248 B2 | 7/2008 | Phillips et al. | |
| 7,401,731 B1 | 7/2008 | Pletz et al. | |
| 7,413,113 B1* | 8/2008 | Zhu | G06Q 20/3572 235/375 |
| 7,451,395 B2 | 11/2008 | Brants et al. | |
| 7,552,088 B2 | 6/2009 | Malcolm | |
| 7,571,142 B1 | 8/2009 | Flitcroft et al. | |
| 7,587,365 B2 | 9/2009 | Malik et al. | |
| 7,653,597 B1 | 1/2010 | Stevanovski et al. | |
| 7,685,037 B2 | 3/2010 | Reiners et al. | |
| 7,689,502 B2 | 3/2010 | Lilly et al. | |
| 7,698,221 B2 | 4/2010 | Blinn et al. | |
| 7,712,655 B2 | 5/2010 | Wong | |
| 7,740,170 B2 | 6/2010 | Singh et al. | |
| 7,753,265 B2 | 7/2010 | Harris | |
| 7,778,932 B2 | 8/2010 | Yan | |
| 7,818,319 B2 | 10/2010 | Henkin et al. | |
| 7,873,573 B2 | 1/2011 | Realini | |
| 7,941,534 B2 | 5/2011 | De La Huerga | |
| 7,949,572 B2 | 5/2011 | Perrochon et al. | |
| 7,954,704 B1 | 6/2011 | Gephart et al. | |
| 8,090,346 B2 | 1/2012 | Cai | |
| 8,099,109 B2 | 1/2012 | Altman et al. | |
| 8,127,982 B1 | 3/2012 | Casey et al. | |
| 8,196,131 B1 | 6/2012 | Von Behren et al. | |
| 8,245,909 B2 | 8/2012 | Pletz et al. | |
| 8,249,983 B2 | 8/2012 | Dilip et al. | |
| 8,255,323 B1 | 8/2012 | Casey et al. | |
| 8,266,031 B2 | 9/2012 | Norris et al. | |
| 8,266,205 B2 | 9/2012 | Hammad et al. | |
| 8,280,786 B1 | 10/2012 | Weiss et al. | |
| 8,296,228 B1 | 10/2012 | Kloor | |
| 8,297,502 B1 | 10/2012 | McGhie et al. | |
| 8,301,566 B2 | 10/2012 | Mears | |
| 8,332,294 B1 | 12/2012 | Thearling | |
| 8,359,531 B2 | 1/2013 | Grandison et al. | |
| 8,360,952 B2 | 1/2013 | Wissman et al. | |
| 8,396,808 B2 | 3/2013 | Greenspan | |
| 8,407,136 B2 | 3/2013 | Bard et al. | |
| 8,407,142 B1 | 3/2013 | Griggs | |
| 8,423,349 B1 | 4/2013 | Huynh et al. | |
| 8,489,761 B2 | 7/2013 | Pope et al. | |
| 8,489,894 B2 | 7/2013 | Comrie et al. | |
| 8,543,506 B2 | 9/2013 | Grandcolas et al. | |
| 8,589,335 B2 | 11/2013 | Smith et al. | |
| 8,595,074 B2 | 11/2013 | Sharma et al. | |
| 8,595,098 B2 | 11/2013 | Starai et al. | |
| 8,625,838 B2 | 1/2014 | Song et al. | |
| 8,630,952 B2 | 1/2014 | Menon | |
| 8,635,687 B2 | 1/2014 | Binder | |
| 8,639,629 B1* | 1/2014 | Hoffman | G06Q 20/3821 705/67 |
| 8,655,310 B1 | 2/2014 | Katzer et al. | |
| 8,655,719 B1 | 2/2014 | Li et al. | |
| 8,666,411 B2 | 3/2014 | Tokgoz et al. | |
| 8,682,753 B2 | 3/2014 | Kulathungam | |
| 8,682,802 B1 | 3/2014 | Kannanari | |
| 8,700,729 B2 | 4/2014 | Dua | |
| 8,712,839 B2 | 4/2014 | Steinert et al. | |
| 8,725,601 B2 | 5/2014 | Ledbetter et al. | |
| 8,762,211 B2 | 6/2014 | Killian et al. | |
| 8,762,237 B2 | 6/2014 | Monasterio et al. | |
| 8,768,838 B1* | 7/2014 | Hoffman | G06Q 40/00 705/44 |
| 8,781,957 B2 | 7/2014 | Jackson et al. | |
| 8,781,963 B1 | 7/2014 | Feng et al. | |
| 8,793,190 B2 | 7/2014 | Johns et al. | |
| 8,794,972 B2 | 8/2014 | Lopucki | |
| 8,851,369 B2* | 10/2014 | Bishop | G06Q 20/12 235/380 |
| 8,868,666 B1 | 10/2014 | Hellwege et al. | |
| 8,880,047 B2 | 11/2014 | Konicek et al. | |
| 8,887,997 B2 | 11/2014 | Barret et al. | |
| 8,925,099 B1 | 12/2014 | Saxe et al. | |
| 8,954,839 B2 | 2/2015 | Sharma et al. | |
| 9,076,134 B2 | 7/2015 | Grovit et al. | |
| 9,105,021 B2 | 8/2015 | Tobin | |
| 9,195,984 B1 | 11/2015 | Spector et al. | |
| 9,256,871 B2 | 2/2016 | Anderson et al. | |
| 9,256,904 B1 | 2/2016 | Haller et al. | |
| 9,305,155 B1 | 4/2016 | Vo et al. | |
| 9,372,849 B2 | 6/2016 | Gluck et al. | |
| 9,390,417 B2 | 7/2016 | Song et al. | |
| 9,396,491 B2 | 7/2016 | Isaacson et al. | |
| 9,444,824 B1 | 9/2016 | Balazs et al. | |
| 9,489,694 B2 | 11/2016 | Haller et al. | |
| 9,519,934 B2 | 12/2016 | Calman et al. | |
| 9,558,478 B2 | 1/2017 | Zhao | |
| 9,569,473 B1 | 2/2017 | Holenstein et al. | |
| 9,569,766 B2 | 2/2017 | Kneen | |
| 9,646,300 B1 | 5/2017 | Zhou et al. | |
| 9,647,855 B2 | 5/2017 | Deibert et al. | |
| 9,690,621 B2 | 6/2017 | Kim et al. | |
| 9,699,610 B1 | 7/2017 | Chicoine et al. | |
| 9,740,543 B1 | 8/2017 | Savage et al. | |
| 9,792,636 B2 | 10/2017 | Milne | |
| 9,792,648 B1 | 10/2017 | Haller et al. | |
| 9,849,364 B2 | 12/2017 | Tran et al. | |
| 9,853,959 B1 | 12/2017 | Kapczynski et al. | |
| 9,858,405 B2 | 1/2018 | Ranadive et al. | |
| 9,858,576 B2 | 1/2018 | Song et al. | |
| 10,044,501 B1 | 8/2018 | Bradley et al. | |
| 10,044,647 B1 | 8/2018 | Karp et al. | |
| 10,050,779 B2 | 8/2018 | Alness et al. | |
| 10,055,747 B1 | 8/2018 | Sherman et al. | |
| 10,115,155 B1 | 10/2018 | Haller et al. | |
| 10,152,756 B2* | 12/2018 | Isaacson | G06Q 20/384 |
| 10,187,483 B2 | 1/2019 | Golub et al. | |
| 10,204,327 B2 | 2/2019 | Katzin et al. | |
| 10,216,548 B1 | 2/2019 | Zhang et al. | |
| 10,250,453 B1 | 4/2019 | Singh et al. | |
| 10,275,602 B2 | 4/2019 | Bjorn et al. | |
| 10,359,915 B2 | 7/2019 | Asai | |
| 10,402,817 B1 | 9/2019 | Benkreira et al. | |
| 10,402,818 B2* | 9/2019 | Zarakas | G06Q 20/321 |
| 10,445,152 B1* | 10/2019 | Zhang | G06F 16/285 |

(56) References Cited

U.S. PATENT DOCUMENTS

| | | | |
|---|---|---|---|
| 10,521,798 B2 | 12/2019 | Song et al. | |
| 10,592,882 B1 | 3/2020 | Viswanath et al. | |
| 10,650,448 B1 | 5/2020 | Haller et al. | |
| 10,657,503 B1 | 5/2020 | Ebersole et al. | |
| 10,872,005 B1 | 12/2020 | Killis | |
| 10,878,496 B1 | 12/2020 | Duong et al. | |
| 10,984,482 B1* | 4/2021 | Thangarajah | G06Q 50/01 |
| 10,992,679 B1 | 4/2021 | Fakhraie et al. | |
| 11,107,561 B2 | 8/2021 | Matthieu et al. | |
| 11,144,903 B2 | 10/2021 | Ready et al. | |
| 11,151,529 B1 | 10/2021 | Nolte et al. | |
| 2001/0001856 A1 | 5/2001 | Gould et al. | |
| 2001/0051920 A1 | 12/2001 | Joao et al. | |
| 2001/0056398 A1 | 12/2001 | Scheirer | |
| 2002/0016749 A1 | 2/2002 | Borecki et al. | |
| 2002/0035539 A1 | 3/2002 | O'Connell | |
| 2002/0038289 A1* | 3/2002 | Lawlor | G06Q 20/04 705/42 |
| 2002/0062249 A1* | 5/2002 | Iannacci | G06Q 20/105 705/14.1 |
| 2002/0095386 A1 | 7/2002 | Maritzen et al. | |
| 2002/0143655 A1 | 10/2002 | Elston et al. | |
| 2002/0169720 A1 | 11/2002 | Wilson et al. | |
| 2003/0046246 A1 | 3/2003 | Klumpp et al. | |
| 2003/0055786 A1 | 3/2003 | Smith et al. | |
| 2003/0061163 A1 | 3/2003 | Durfield | |
| 2003/0097331 A1 | 5/2003 | Cohen | |
| 2003/0172040 A1 | 9/2003 | Kemper et al. | |
| 2003/0195847 A1 | 10/2003 | Felger | |
| 2003/0200179 A1 | 10/2003 | Kwan | |
| 2003/0216997 A1 | 11/2003 | Cohen | |
| 2003/0217001 A1 | 11/2003 | McQuaide et al. | |
| 2004/0054564 A1 | 3/2004 | Fonseca et al. | |
| 2004/0054591 A1 | 3/2004 | Spaeth et al. | |
| 2004/0073903 A1 | 4/2004 | Melchione et al. | |
| 2004/0078325 A1 | 4/2004 | O'Connor | |
| 2004/0090825 A1 | 5/2004 | Nam et al. | |
| 2004/0143632 A1 | 7/2004 | McCarty | |
| 2004/0148259 A1 | 7/2004 | Reiners et al. | |
| 2004/0178907 A1 | 9/2004 | Cordoba | |
| 2004/0249710 A1 | 12/2004 | Smith et al. | |
| 2004/0249753 A1 | 12/2004 | Blinn et al. | |
| 2004/0263901 A1 | 12/2004 | Critelli et al. | |
| 2005/0010483 A1 | 1/2005 | Ling | |
| 2005/0014705 A1 | 1/2005 | Cheng et al. | |
| 2005/0039041 A1 | 2/2005 | Shaw et al. | |
| 2005/0060233 A1 | 3/2005 | Bonalle et al. | |
| 2005/0114705 A1 | 5/2005 | Reshef et al. | |
| 2005/0131815 A1 | 6/2005 | Fung et al. | |
| 2005/0171898 A1 | 8/2005 | Bishop et al. | |
| 2005/0199714 A1 | 9/2005 | Brandt et al. | |
| 2005/0205662 A1 | 9/2005 | Nelson | |
| 2005/0224587 A1 | 10/2005 | Shin et al. | |
| 2005/0228750 A1 | 10/2005 | Olliphant et al. | |
| 2005/0273431 A1* | 12/2005 | Abel | G06Q 20/102 705/42 |
| 2006/0046742 A1 | 3/2006 | Zhang | |
| 2006/0046745 A1 | 3/2006 | Davidson | |
| 2006/0059110 A1 | 3/2006 | Madhok et al. | |
| 2006/0178986 A1* | 8/2006 | Giordano | G06Q 20/20 705/40 |
| 2006/0184456 A1 | 8/2006 | De Janasz | |
| 2006/0190374 A1 | 8/2006 | Sher | |
| 2006/0202012 A1* | 9/2006 | Grano | G06Q 20/26 235/379 |
| 2006/0206912 A1* | 9/2006 | Klarfeld | H04N 21/251 725/40 |
| 2006/0235795 A1 | 10/2006 | Johnson et al. | |
| 2006/0278698 A1 | 12/2006 | Lovett | |
| 2007/0051797 A1 | 3/2007 | Randolph-Wall et al. | |
| 2007/0083463 A1 | 4/2007 | Kraft | |
| 2007/0100773 A1 | 5/2007 | Wallach | |
| 2007/0112673 A1 | 5/2007 | Protti | |
| 2007/0123305 A1 | 5/2007 | Chen et al. | |
| 2007/0143831 A1 | 6/2007 | Pearson et al. | |
| 2007/0203836 A1 | 8/2007 | Dodin | |
| 2007/0226086 A1 | 9/2007 | Bauman et al. | |
| 2007/0255653 A1 | 11/2007 | Tumminaro et al. | |
| 2007/0266257 A1 | 11/2007 | Camaisa et al. | |
| 2008/0000052 A1 | 1/2008 | Hong et al. | |
| 2008/0005037 A1 | 1/2008 | Hammad et al. | |
| 2008/0017702 A1 | 1/2008 | Little et al. | |
| 2008/0021787 A1* | 1/2008 | Mackouse | G06Q 20/204 705/17 |
| 2008/0029608 A1 | 2/2008 | Kellum et al. | |
| 2008/0052226 A1* | 2/2008 | Agarwal | G06Q 20/3821 705/39 |
| 2008/0066185 A1 | 3/2008 | Lester et al. | |
| 2008/0086398 A1 | 4/2008 | Parlotto | |
| 2008/0115104 A1 | 5/2008 | Quinn | |
| 2008/0149706 A1 | 6/2008 | Brown et al. | |
| 2008/0154772 A1 | 6/2008 | Carlson | |
| 2008/0170156 A1 | 7/2008 | Kim | |
| 2008/0191878 A1 | 8/2008 | Abraham | |
| 2008/0208726 A1 | 8/2008 | Tsantes et al. | |
| 2008/0226142 A1 | 9/2008 | Pennella et al. | |
| 2008/0229383 A1 | 9/2008 | Buss et al. | |
| 2008/0244724 A1 | 10/2008 | Choe et al. | |
| 2008/0260119 A1 | 10/2008 | Marathe et al. | |
| 2008/0283590 A1 | 11/2008 | Oder et al. | |
| 2008/0301043 A1 | 12/2008 | Unbehagen | |
| 2008/0319889 A1 | 12/2008 | Hammad et al. | |
| 2009/0005269 A1 | 1/2009 | Martin et al. | |
| 2009/0007231 A1 | 1/2009 | Kaiser et al. | |
| 2009/0055269 A1 | 2/2009 | Baron | |
| 2009/0055642 A1 | 2/2009 | Myers et al. | |
| 2009/0112763 A1 | 4/2009 | Scipioni et al. | |
| 2009/0132351 A1 | 5/2009 | Gibson | |
| 2009/0164324 A1 | 6/2009 | Bishop et al. | |
| 2009/0205014 A1 | 8/2009 | Doman et al. | |
| 2009/0228381 A1 | 9/2009 | Mik et al. | |
| 2009/0254447 A1 | 10/2009 | Blades | |
| 2009/0254971 A1* | 10/2009 | Herz | G06Q 30/0603 726/1 |
| 2009/0287603 A1 | 11/2009 | Lamar et al. | |
| 2009/0319638 A1 | 12/2009 | Faith et al. | |
| 2010/0036769 A1 | 2/2010 | Winters et al. | |
| 2010/0036906 A1 | 2/2010 | Song et al. | |
| 2010/0063906 A1 | 3/2010 | Nelsen et al. | |
| 2010/0082445 A1* | 4/2010 | Hodge | G06Q 20/20 705/21 |
| 2010/0082487 A1 | 4/2010 | Nelsen | |
| 2010/0114768 A1 | 5/2010 | Duke et al. | |
| 2010/0132049 A1 | 5/2010 | Vernal et al. | |
| 2010/0199098 A1 | 8/2010 | King | |
| 2010/0228671 A1 | 9/2010 | Patterson | |
| 2010/0274691 A1 | 10/2010 | Hammad et al. | |
| 2010/0276484 A1 | 11/2010 | Banerjee et al. | |
| 2010/0312700 A1 | 12/2010 | Coulter et al. | |
| 2010/0327056 A1 | 12/2010 | Yoshikawa et al. | |
| 2011/0023129 A1 | 1/2011 | Vernal et al. | |
| 2011/0035288 A1* | 2/2011 | Clyne | G06Q 30/02 705/14.71 |
| 2011/0035318 A1* | 2/2011 | Hargrove | G06Q 20/40 705/44 |
| 2011/0035596 A1 | 2/2011 | Attia et al. | |
| 2011/0078010 A1 | 3/2011 | Postrel | |
| 2011/0106698 A1 | 5/2011 | Isaacson et al. | |
| 2011/0162057 A1 | 6/2011 | Gottumukkala et al. | |
| 2011/0176010 A1 | 7/2011 | Houjou et al. | |
| 2011/0178929 A1 | 7/2011 | Durkin et al. | |
| 2011/0191177 A1 | 8/2011 | Blackhurst et al. | |
| 2011/0191239 A1 | 8/2011 | Blackhurst et al. | |
| 2011/0196791 A1* | 8/2011 | Dominguez | G06Q 20/40 705/44 |
| 2011/0202462 A1 | 8/2011 | Keenan | |
| 2011/0218849 A1 | 9/2011 | Rutigliano et al. | |
| 2011/0247055 A1 | 10/2011 | Guo et al. | |
| 2011/0276479 A1 | 11/2011 | Thomas | |
| 2011/0307826 A1 | 12/2011 | Rivera et al. | |
| 2011/0320246 A1 | 12/2011 | Tietzen et al. | |
| 2012/0024946 A1 | 2/2012 | Tullis et al. | |
| 2012/0030109 A1 | 2/2012 | Dooley Maley et al. | |

(56) References Cited

U.S. PATENT DOCUMENTS

| | | |
|---|---|---|
| 2012/0041881 A1 | 2/2012 | Basu et al. |
| 2012/0046994 A1 | 2/2012 | Reisman |
| 2012/0047072 A1 | 2/2012 | Larkin |
| 2012/0096534 A1 | 4/2012 | Boulos et al. |
| 2012/0099780 A1 | 4/2012 | Smith et al. |
| 2012/0101938 A1 | 4/2012 | Kasower |
| 2012/0123841 A1 | 5/2012 | Taveau et al. |
| 2012/0123933 A1 | 5/2012 | Abel et al. |
| 2012/0124658 A1 | 5/2012 | Brudnicki et al. |
| 2012/0158590 A1 | 6/2012 | Salonen |
| 2012/0173387 A1 | 7/2012 | Talker et al. |
| 2012/0197691 A1* | 8/2012 | Grigg ............... G06Q 20/363 705/14.1 |
| 2012/0214577 A1 | 8/2012 | Petersen et al. |
| 2012/0227094 A1 | 9/2012 | Begen et al. |
| 2012/0239417 A1 | 9/2012 | Pourfallah et al. |
| 2012/0239479 A1 | 9/2012 | Amaro et al. |
| 2012/0239670 A1 | 9/2012 | Horn et al. |
| 2012/0240235 A1 | 9/2012 | Moore |
| 2012/0246122 A1 | 9/2012 | Short et al. |
| 2012/0254038 A1 | 10/2012 | Mullen |
| 2012/0259782 A1 | 10/2012 | Hammad |
| 2012/0265682 A1 | 10/2012 | Menon |
| 2012/0265685 A1* | 10/2012 | Brudnicki ............... H04W 4/02 705/44 |
| 2012/0270522 A1 | 10/2012 | Laudermilch et al. |
| 2012/0296725 A1 | 11/2012 | Dessert et al. |
| 2012/0296831 A1 | 11/2012 | Carrott |
| 2012/0310760 A1 | 12/2012 | Phillips et al. |
| 2012/0317036 A1 | 12/2012 | Bower et al. |
| 2013/0006847 A1* | 1/2013 | Hammad ............... G06Q 20/382 705/39 |
| 2013/0031006 A1 | 1/2013 | McCullagh et al. |
| 2013/0046607 A1* | 2/2013 | Granville, III ...... G06Q 30/0241 705/14.27 |
| 2013/0046690 A1 | 2/2013 | Calman et al. |
| 2013/0055378 A1 | 2/2013 | Chang et al. |
| 2013/0080219 A1 | 3/2013 | Royyuru et al. |
| 2013/0091452 A1 | 4/2013 | Sorden et al. |
| 2013/0103391 A1 | 4/2013 | Millmore et al. |
| 2013/0117696 A1 | 5/2013 | Robertson et al. |
| 2013/0132854 A1 | 5/2013 | Raleigh et al. |
| 2013/0173402 A1* | 7/2013 | Young ............... G06Q 30/0631 705/14.73 |
| 2013/0174244 A1 | 7/2013 | Taveau et al. |
| 2013/0191213 A1* | 7/2013 | Beck ............... G06Q 30/0207 705/14.64 |
| 2013/0212666 A1 | 8/2013 | Mattsson et al. |
| 2013/0218649 A1 | 8/2013 | Beal |
| 2013/0218758 A1* | 8/2013 | Koenigsbrueck et al. ............... G06Q 40/02 705/39 |
| 2013/0226813 A1 | 8/2013 | Voltz |
| 2013/0240618 A1 | 9/2013 | Hall |
| 2013/0246258 A1* | 9/2013 | Dessert ............... G06Q 20/36 705/41 |
| 2013/0246272 A1 | 9/2013 | Kirsch |
| 2013/0254079 A1 | 9/2013 | Murali |
| 2013/0254115 A1 | 9/2013 | Pasa et al. |
| 2013/0282542 A1 | 10/2013 | White |
| 2013/0301392 A1 | 11/2013 | Zhao |
| 2013/0339124 A1 | 12/2013 | Postrel |
| 2013/0346302 A1 | 12/2013 | Purves et al. |
| 2013/0346306 A1 | 12/2013 | Kopp |
| 2013/0346310 A1 | 12/2013 | Burger et al. |
| 2014/0006209 A1 | 1/2014 | Groarke |
| 2014/0019352 A1* | 1/2014 | Shrivastava ......... G06Q 20/326 705/41 |
| 2014/0026193 A1 | 1/2014 | Saxman et al. |
| 2014/0032419 A1 | 1/2014 | Anderson et al. |
| 2014/0032723 A1 | 1/2014 | Nema |
| 2014/0040134 A1 | 2/2014 | Ciurea |
| 2014/0040144 A1 | 2/2014 | Plomske et al. |
| 2014/0046827 A1 | 2/2014 | Hochstatter et al. |
| 2014/0053069 A1 | 2/2014 | Yan |
| 2014/0067503 A1 | 3/2014 | Ebarle Grecsek et al. |
| 2014/0067683 A1 | 3/2014 | Varadarajan |
| 2014/0068030 A1 | 3/2014 | Chambers et al. |
| 2014/0076967 A1 | 3/2014 | Pushkin et al. |
| 2014/0081736 A1 | 3/2014 | Blackhurst et al. |
| 2014/0108260 A1 | 4/2014 | Poole et al. |
| 2014/0108263 A1 | 4/2014 | Ortiz et al. |
| 2014/0114780 A1* | 4/2014 | Menefee ............... G06Q 20/327 705/21 |
| 2014/0114855 A1 | 4/2014 | Bajaj et al. |
| 2014/0122328 A1* | 5/2014 | Grigg ............... G06Q 20/3276 705/40 |
| 2014/0123312 A1 | 5/2014 | Marcotte |
| 2014/0129357 A1* | 5/2014 | Goodwin ............... G06Q 20/20 705/16 |
| 2014/0129448 A1 | 5/2014 | Aiglstorfer |
| 2014/0143886 A1 | 5/2014 | Eversoll et al. |
| 2014/0149198 A1* | 5/2014 | Kim ............... G06Q 30/0226 705/14.27 |
| 2014/0149368 A1 | 5/2014 | Lee et al. |
| 2014/0162598 A1 | 6/2014 | Villa-Real |
| 2014/0164220 A1* | 6/2014 | Desai ............... G06Q 20/227 705/39 |
| 2014/0172576 A1* | 6/2014 | Spears ............... G06Q 30/0266 705/14.63 |
| 2014/0172707 A1* | 6/2014 | Kuntagod ............. G06Q 20/405 705/44 |
| 2014/0180854 A1 | 6/2014 | Bryant, II |
| 2014/0198054 A1 | 7/2014 | Sharma et al. |
| 2014/0200957 A1 | 7/2014 | Biggs |
| 2014/0207672 A1 | 7/2014 | Kelley |
| 2014/0236792 A1 | 8/2014 | Pant et al. |
| 2014/0237236 A1 | 8/2014 | Kalinichenko et al. |
| 2014/0250002 A1* | 9/2014 | Isaacson ............. G06Q 30/0224 705/39 |
| 2014/0258109 A1 | 9/2014 | Jiang et al. |
| 2014/0258110 A1 | 9/2014 | Davis et al. |
| 2014/0279309 A1* | 9/2014 | Cowen ............... G06Q 20/4016 705/30 |
| 2014/0279474 A1* | 9/2014 | Evans ............... G06Q 20/40 705/41 |
| 2014/0279559 A1 | 9/2014 | Smith et al. |
| 2014/0282852 A1 | 9/2014 | Vestevich |
| 2014/0297438 A1* | 10/2014 | Dua ............... G06Q 20/32 705/21 |
| 2014/0324527 A1 | 10/2014 | Kulkarni et al. |
| 2014/0344149 A1 | 11/2014 | Campos |
| 2014/0344153 A1 | 11/2014 | Raj et al. |
| 2014/0344877 A1 | 11/2014 | Ohmata et al. |
| 2014/0365291 A1 | 12/2014 | Shvarts |
| 2014/0372308 A1 | 12/2014 | Sheets |
| 2014/0379575 A1 | 12/2014 | Rogan |
| 2015/0019443 A1 | 1/2015 | Sheets et al. |
| 2015/0019944 A1 | 1/2015 | Kalgi |
| 2015/0026026 A1 | 1/2015 | Calman et al. |
| 2015/0026049 A1 | 1/2015 | Theurer et al. |
| 2015/0026057 A1 | 1/2015 | Calman et al. |
| 2015/0032625 A1 | 1/2015 | Dill et al. |
| 2015/0032626 A1 | 1/2015 | Dill et al. |
| 2015/0032627 A1 | 1/2015 | Dill et al. |
| 2015/0039457 A1 | 2/2015 | Jacobs et al. |
| 2015/0046338 A1 | 2/2015 | Laxminarayanan et al. |
| 2015/0046339 A1 | 2/2015 | Wong et al. |
| 2015/0066768 A1 | 3/2015 | Williamson et al. |
| 2015/0070132 A1 | 3/2015 | Candelore |
| 2015/0073989 A1* | 3/2015 | Green ............... G06Q 20/405 705/44 |
| 2015/0079932 A1 | 3/2015 | Zelinka et al. |
| 2015/0081349 A1 | 3/2015 | Johndrow et al. |
| 2015/0082042 A1 | 3/2015 | Hoornaert et al. |
| 2015/0088633 A1* | 3/2015 | Salmon ............... G06Q 20/227 705/14.33 |
| 2015/0088756 A1 | 3/2015 | Makhotin et al. |
| 2015/0095238 A1 | 4/2015 | Khan et al. |
| 2015/0096039 A1 | 4/2015 | Mattsson et al. |
| 2015/0100477 A1 | 4/2015 | Salama et al. |
| 2015/0100495 A1 | 4/2015 | Salama et al. |

(56) References Cited

U.S. PATENT DOCUMENTS

| | | |
|---|---|---|
| 2015/0106239 A1 | 4/2015 | Gaddam et al. |
| 2015/0112870 A1 | 4/2015 | Nagasundaram et al. |
| 2015/0121500 A1 | 4/2015 | Venkatanaranappa et al. |
| 2015/0127524 A1 | 5/2015 | Jacobs et al. |
| 2015/0127547 A1 | 5/2015 | Powell et al. |
| 2015/0128215 A1 | 5/2015 | Son et al. |
| 2015/0132984 A1 | 5/2015 | Kim et al. |
| 2015/0134700 A1 | 5/2015 | MacKlem et al. |
| 2015/0142673 A1 | 5/2015 | Nelsen et al. |
| 2015/0149272 A1* | 5/2015 | Salmon ............... G07F 17/0035 705/14.33 |
| 2015/0154595 A1 | 6/2015 | Collinge et al. |
| 2015/0178724 A1 | 6/2015 | Ngo et al. |
| 2015/0180836 A1 | 6/2015 | Wong et al. |
| 2015/0193639 A1 | 7/2015 | Esposito et al. |
| 2015/0193764 A1 | 7/2015 | Haggerty et al. |
| 2015/0193866 A1 | 7/2015 | Van Heerden et al. |
| 2015/0199679 A1 | 7/2015 | Palanisamy et al. |
| 2015/0199689 A1 | 7/2015 | Kumnick et al. |
| 2015/0200495 A1 | 7/2015 | Yu et al. |
| 2015/0213435 A1 | 7/2015 | Douglas et al. |
| 2015/0220917 A1 | 8/2015 | Aabye et al. |
| 2015/0220999 A1 | 8/2015 | Thornton et al. |
| 2015/0221149 A1 | 8/2015 | Main et al. |
| 2015/0242853 A1 | 8/2015 | Powell |
| 2015/0248405 A1 | 9/2015 | Rudich et al. |
| 2015/0254635 A1 | 9/2015 | Bondesen et al. |
| 2015/0254638 A1 | 9/2015 | Bondesen et al. |
| 2015/0254646 A1* | 9/2015 | Harkey ............... G06Q 20/385 705/67 |
| 2015/0254647 A1 | 9/2015 | Bondesen et al. |
| 2015/0254655 A1 | 9/2015 | Bondesen et al. |
| 2015/0254656 A1 | 9/2015 | Bondesen et al. |
| 2015/0269566 A1 | 9/2015 | Gaddam et al. |
| 2015/0277712 A1 | 10/2015 | Ratcliffe et al. |
| 2015/0286834 A1 | 10/2015 | Ohtani et al. |
| 2015/0287133 A1 | 10/2015 | Marlov et al. |
| 2015/0295906 A1 | 10/2015 | Ufford et al. |
| 2015/0312038 A1 | 10/2015 | Palanisamy |
| 2015/0319198 A1 | 11/2015 | Gupta et al. |
| 2015/0324592 A1 | 11/2015 | Dutta |
| 2015/0332067 A1 | 11/2015 | Gorod |
| 2015/0339663 A1 | 11/2015 | Lopreiato et al. |
| 2015/0339664 A1 | 11/2015 | Wong et al. |
| 2015/0348083 A1* | 12/2015 | Brill .................. G06Q 20/386 705/14.23 |
| 2015/0371221 A1 | 12/2015 | Wardman |
| 2015/0372999 A1 | 12/2015 | Pi-Sunyer |
| 2015/0379508 A1 | 12/2015 | Van |
| 2016/0004741 A1 | 1/2016 | Johnson et al. |
| 2016/0026997 A1 | 1/2016 | Tsui et al. |
| 2016/0028550 A1 | 1/2016 | Gaddam et al. |
| 2016/0028735 A1 | 1/2016 | Francis et al. |
| 2016/0036790 A1 | 2/2016 | Shastry et al. |
| 2016/0042381 A1 | 2/2016 | Braine et al. |
| 2016/0063497 A1 | 3/2016 | Grant, IV |
| 2016/0065370 A1 | 3/2016 | Le Saint et al. |
| 2016/0078428 A1 | 3/2016 | Moser et al. |
| 2016/0080403 A1 | 3/2016 | Cunningham et al. |
| 2016/0086222 A1* | 3/2016 | Kurapati ............... G06Q 40/08 705/14.53 |
| 2016/0092870 A1 | 3/2016 | Salama et al. |
| 2016/0092872 A1 | 3/2016 | Prakash et al. |
| 2016/0092874 A1 | 3/2016 | O'Regan et al. |
| 2016/0098577 A1 | 4/2016 | Lacey et al. |
| 2016/0098692 A1 | 4/2016 | Johnson et al. |
| 2016/0109954 A1 | 4/2016 | Harris et al. |
| 2016/0119296 A1 | 4/2016 | Laxminarayanan et al. |
| 2016/0125405 A1 | 5/2016 | Alterman et al. |
| 2016/0125409 A1 | 5/2016 | Meredith et al. |
| 2016/0127892 A1 | 5/2016 | Huang et al. |
| 2016/0140221 A1 | 5/2016 | Park et al. |
| 2016/0149875 A1 | 5/2016 | Li et al. |
| 2016/0155156 A1* | 6/2016 | Gopal ............... G06Q 30/0282 705/14.66 |
| 2016/0173483 A1 | 6/2016 | Wong et al. |
| 2016/0180302 A1 | 6/2016 | Bagot, Jr. |
| 2016/0189121 A1 | 6/2016 | Best et al. |
| 2016/0217461 A1 | 7/2016 | Gaddam et al. |
| 2016/0232600 A1 | 8/2016 | Purves |
| 2016/0239437 A1 | 8/2016 | Le et al. |
| 2016/0239835 A1 | 8/2016 | Marsyla |
| 2016/0239840 A1 | 8/2016 | Preibisch |
| 2016/0260084 A1 | 9/2016 | Main et al. |
| 2016/0260176 A1 | 9/2016 | Bernard et al. |
| 2016/0267467 A1 | 9/2016 | Rutherford et al. |
| 2016/0267480 A1 | 9/2016 | Metral |
| 2016/0292673 A1 | 10/2016 | Chandrasekaran |
| 2016/0294879 A1 | 10/2016 | Kirsch |
| 2016/0307229 A1 | 10/2016 | Balasubramanian et al. |
| 2016/0314458 A1 | 10/2016 | Douglas et al. |
| 2016/0321669 A1 | 11/2016 | Beck et al. |
| 2016/0328522 A1 | 11/2016 | Howley |
| 2016/0328577 A1 | 11/2016 | Howley |
| 2016/0358163 A1 | 12/2016 | Kumar et al. |
| 2016/0371471 A1 | 12/2016 | Patton et al. |
| 2016/0373458 A1 | 12/2016 | Moreton et al. |
| 2016/0379211 A1 | 12/2016 | Hoyos et al. |
| 2017/0004506 A1 | 1/2017 | Steinman et al. |
| 2017/0011215 A1 | 1/2017 | Poiesz et al. |
| 2017/0011389 A1 | 1/2017 | McCandless et al. |
| 2017/0011450 A1* | 1/2017 | Frager .................. G06Q 20/12 |
| 2017/0024393 A1 | 1/2017 | Choksi et al. |
| 2017/0068954 A1 | 3/2017 | Hockey et al. |
| 2017/0078303 A1 | 3/2017 | Wu |
| 2017/0091759 A1 | 3/2017 | Selfridge et al. |
| 2017/0132633 A1 | 5/2017 | Whitehouse |
| 2017/0147631 A1 | 5/2017 | Nair et al. |
| 2017/0249478 A1 | 8/2017 | Lovin |
| 2017/0344991 A1* | 11/2017 | Mark .................. G06Q 20/425 |
| 2017/0352028 A1 | 12/2017 | Vridhachalam et al. |
| 2018/0006821 A1 | 1/2018 | Kinagi |
| 2018/0025145 A1 | 1/2018 | Morgner et al. |
| 2018/0053200 A1 | 2/2018 | Cronin et al. |
| 2018/0088909 A1 | 3/2018 | Baratta et al. |
| 2018/0158137 A1 | 6/2018 | Tsantes et al. |
| 2018/0270363 A1 | 9/2018 | Guday et al. |
| 2018/0276628 A1 | 9/2018 | Radiotis et al. |
| 2018/0349922 A1* | 12/2018 | Carlson ............... G06Q 30/0254 |
| 2018/0357440 A1 | 12/2018 | Brady et al. |
| 2018/0373891 A1 | 12/2018 | Barday et al. |
| 2019/0007381 A1 | 1/2019 | Isaacson et al. |
| 2019/0035664 A1 | 1/2019 | Lin et al. |
| 2019/0171831 A1 | 6/2019 | Xin |
| 2019/0197501 A1 | 6/2019 | Senci et al. |
| 2019/0228173 A1 | 7/2019 | Gupta et al. |
| 2019/0228428 A1 | 7/2019 | Bruner et al. |
| 2019/0228430 A1 | 7/2019 | Givol et al. |
| 2019/0318122 A1 | 10/2019 | Hockey et al. |
| 2019/0325161 A1 | 10/2019 | Zavesky et al. |
| 2019/0332802 A1 | 10/2019 | Barday et al. |
| 2019/0333061 A1 | 10/2019 | Jackson et al. |
| 2019/0347442 A1 | 11/2019 | Marlin et al. |
| 2019/0354979 A1* | 11/2019 | Crawford ............. G06Q 20/405 |
| 2019/0356641 A1 | 11/2019 | Isaacson et al. |
| 2019/0362069 A1 | 11/2019 | Park et al. |
| 2019/0369845 A1 | 12/2019 | Rucker |
| 2019/0370798 A1 | 12/2019 | Hu et al. |
| 2019/0392443 A1 | 12/2019 | Piparsaniya et al. |
| 2020/0005347 A1 | 1/2020 | Boal |
| 2020/0074552 A1 | 3/2020 | Shier et al. |
| 2020/0090179 A1 | 3/2020 | Song et al. |
| 2020/0118114 A1 | 4/2020 | Benkreira et al. |
| 2020/0118133 A1 | 4/2020 | Schmidt et al. |
| 2020/0286057 A1 | 9/2020 | Desai |
| 2021/0303335 A1 | 9/2021 | Foreman et al. |

FOREIGN PATENT DOCUMENTS

| | | | |
|---|---|---|---|
| CN | 104106276 B * | 3/2019 | ............ G06F 3/08 |
| EP | 1 259 947 A2 | 11/2002 | |
| EP | 1 770 628 A2 | 4/2007 | |

(56) References Cited

FOREIGN PATENT DOCUMENTS

| | | | | |
|---|---|---|---|---|
| GB | 2 441 156 | | 2/2008 | |
| KR | 20160015375 | | 2/2016 | |
| KR | 20160015375 A | * | 2/2016 | ........... G06Q 20/405 |
| WO | WO-90/13096 A1 | | 11/1990 | |
| WO | WO-2004/081893 | | 9/2004 | |
| WO | WO-2004/090825 | | 10/2004 | |
| WO | WO-2011017613 A2 | * | 2/2011 | ............. G06Q 20/10 |
| WO | WO-2013082190 A1 | * | 6/2013 | ............. G06F 21/577 |
| WO | WO-2015/103443 | | 7/2015 | |
| WO | WO-2016/015054 A1 | | 1/2016 | |
| WO | WO-2016025291 A1 | * | 2/2016 | ............. G06Q 30/02 |
| WO | WO-2017/035399 A1 | | 3/2017 | |

OTHER PUBLICATIONS

Hinze et al.; Event-Based Applications and Enabling Technologies. https://www.researchgate.net/profile/Annika-Hinze/publication/220796268_Event-based_applications_and_enabling_technologies/links/0fcfd50b638d9592a1000000/Event-based-applications-and-enabling-technologies.pdf (Year: 2009).*

Cronian, Darrin "Credit card companies Freeze Spending whilst Abroad", published Jun. 9, 2007, Available at: http://www.travel-rants.com/2007/06/09/credit-card-companies-freeze-spending-whilst-abroad/.

Microsoft, "Automatically summarize a document", 2016. 3 pages.

Austin Telco Federal Credit Union, "Lost or Stolen Cards", www.atfcu.org/lost-stolen-cards.htm; Apr. 9, 2004. 6 pages.

BancFirst, "Lost Card", https://www.bancfirst.com/contact.aspx, Oct. 28, 2003. 1 page.

CM/ECF, "CM/ECF Internet Credit Card Payment Guide", https://www.vaeb.uscourts.gov/wordpress/?page_id=340, Mar. 16, 2005. 12 pages.

Fort Knox Federal Credit Union, "Lost or Stolen VISA Card", http://www.fortknoxfcu.org/loststolen.html, Feb. 1, 2001. 2 pages.

Merrick Bank, "Reporting Lost or Stolen Card Help Return to the Cardholder Center FAQs", http://www.merrickbank.com/Frequent-Asked-Questions/Report-Stolen-Card.aspx, Aug. 9, 2004. 1 page.

RBL Royal Bank, "If Your Card is Lost or Stolen", http://www.rblbank.com/pdfs/CreditCard/FAQs.pdf, Oct. 1, 2002. 2 pages.

State Employees Credit Union, "Lost or Stolen Account Info", https://www.secumd.org/advice-planning/money-and-credit/privacy-fraud-protection/lost-or-stolen-account-info.aspx, May 20, 2005. 2 pages.

Union Bank & Trust, "Report Lost or Stolen Card", http://www.fortknoxfcu.org/loststolen.html, Jul. 10, 2005. 13 pages.

ASB, "How to command your cards with ASB Card Control" Apr. 20, 2015, https://www.youtube.com/watch?v=O1sfxvVUL74 (Year: 2015).

Authorize.Net. Authorize.Net Mobile Application: iOS User Guide. Sep. 2015. Authorize.Net LLC. Ver.2.0, 1-23. https://www.authorize.net/content/dam/anet-redesign/documents/iosuserguide.pdf(Year: 2015).

CO-OP Think, Rachna Ahlawat at CO-OP Think—Evolution Sessions from THINK14, Dec. 22, 2014, 26:22. https://www.youtube.com/watch?v=yEp-qfZoPhI (Year: 2014).

Fiserv. CardValet: Mobile Application Training. Fiserv, Inc. 1-93. https://www.westernbanks.com/media/1664/cardvalet-application.pdf (Year: 2015).

IP.com Search Query; May 5, 2020 (Year: 2020).

Notre Dame FCU "Irish Card Shield: How to Control Transaction Types" Jan. 15, 2016, 0:27, https://youtube.com/watch?v=0eZG1c6Bn38 (Year: 2016).

PCM Credit Union, "CardValet Tutorial" Jun. 24, 2015, https://www.youtube.com/watch?v=uGPh9Htw0Wc (Year: 2015).

Transaction aggregation as a strategy for credit card fraud detection. file:///C:/Users/eoussir/Downloads/Transaction_aggregation_as_a_strategy for credit_c. pdf (Year: 2009).

IEEE Xplore; 2009 First Asian Himalayas International Conference on Internet: Emergence of Payment Systems in the age of Electronic Commerce.; The state off Art. Author S Singh Nov. 1, 2009 pp. 1-18 (Year: 2009).

Purchasing charges ahead. (1994). Electronic Buyers' News,, 68. Retrieved from https://dialog.proquest.com/professional/docview/681599288?accountid=131444 on Nov. 13, 2020 (Year: 1994).

Using location aware business rules for preventing retail banking frauds. https://ieeexplore.ieee.org/stamp/stamp.jsp?tp=&arnumber=7351936 (Year: 2015).

Smartphones as Practical and Secure Location Verification Tokens for Payments. file:///C:/Users/eoussir/Documents/e-Red%20Folder/15496961/N PL_Smartphones%20as%20Practical%20and%20Secure%20Location%20Verification%20Tokens%20for%20Payments.pdf (Year: 2014).

Demiriz et al. "Using Location Aware Business Rules for Preventing Retail Banking Frauds" Jan. 15, 2015, IEEE (Year: 2015).

Diversinet enables new consumer mobile services from intersections inc.; MobiSecure wallet and vault helps identity management leader get closer to its customers. (May 30, 2007). PR Newswire Retrieved from https://dialog.proquest.com/professional/docview/450976918?accountid=131444 on Feb. 22, 2023 (Year: 2007).

Urein et al: "A breakthrough for prepaid payment: End to end token exchange and management using secure SSL channels created by EAP-TLS smart cards", 2011 International Conference on Collaboration Technologies and Systems (CTS) (Year: 2011).

Yang MH. Security enhanced EMV-based mobile payment protocol. Scientific World Journal. 2014.https://www.ncbi.nlm.nih.gov/pmc/articles/PMC4181509/ (Year: 2014).

Eickhoff et al: "Quality through Flow and Immersion: Gamifying Crowdsourced Relevance Assessments", Proceedings of the 35th international ACM SIGIR conference on Research and development in information retrieval, Aug. 12, 2012. (Year: 2012).

Technologies for Payment Fraud Prevention: EMV, Encryption, and Tokenization, Oct. 2014, Smart Card Alliance, pp. 1-34 (Year: 2014).

* cited by examiner

SYSTEM AND METHOD FOR CARD CONTROL

CROSS REFERENCE TO RELATED PATENT APPLICATIONS

This application is a continuation of U.S. patent application Ser. No. 15/496,961, filed on Apr. 25, 2017, the entirety of which is incorporated by reference herein.

BACKGROUND

Payment cards, such as credit cards and debits cards, are used commonly to make a variety of purchases. Due to the widespread use of payment cards, unauthorized use and payment card fraud are also on the rise. While various fraud prevention mechanisms are used to protect users against unauthorized use and fraud, such mechanisms often provide after-the-fact protection and cause the users' payment card to be canceled and re-issued. While other mechanisms may operate more proactively to prevent a fraudulent transaction before it happens, these fraud prevention mechanisms are often still inconvenient for the users.

SUMMARY

In accordance with at least some aspects of the present disclosure, a system is disclosed. The system includes a card control computing system configured to enforce card control rules for a payment card of a user. The card control computing system includes a memory unit configured to store information associated with a card control dashboard and a processing unit. The processing unit is configured to automatically create a card control rule for the payment card, cause presentation of the card control rule in the card control dashboard via a display associated with a remote computing device, wherein the card control dashboard comprises a user interface, and receive an input via the user interface to enable or disable the card control rule. The processing unit is also configured to monitor the payment card to enforce the card control rules.

In accordance with at least some other aspects of the present disclosure, a method is disclosed. The method includes automatically creating, by a card control computing system, a card control rule for a payment card of a user, causing presentation, by the card control computing system, of the proposed card control rule in a card control dashboard via a display associated with a remote computing device, wherein the card control dashboard comprises a user interface, and receiving, by the card control computing system, an input via the user interface to enable or disable the card control rule. The method also includes monitoring, by the card control computing system, the payment card for enforcing the card control rules.

In accordance with at least some other aspects of the present disclosure, a method is disclosed. The method includes automatically creating, by a card control computing system, a card control rule for a payment card of a user, receiving, by the card control computing system, an input via the user interface to enable or disable the card control rule, and monitoring, by the card control computing system, the payment card for enforcing the card control rule. The method also includes determining, by the card control computing system, if the card control rule is triggered, sending, by the card control computing system, an alert to a device associated with the user in response to the trigger, and receiving, by the card control computing system, another input via the device in response to the alert. The method further includes modifying, by the card control computing system, the card control rule based upon the another input.

The foregoing summary is illustrative only and is not intended to be in any way limiting. In addition to the illustrative aspects, embodiments, and features described above, further aspects, embodiments, and features will become apparent by reference to the following drawings and the detailed description.

Figure 1:
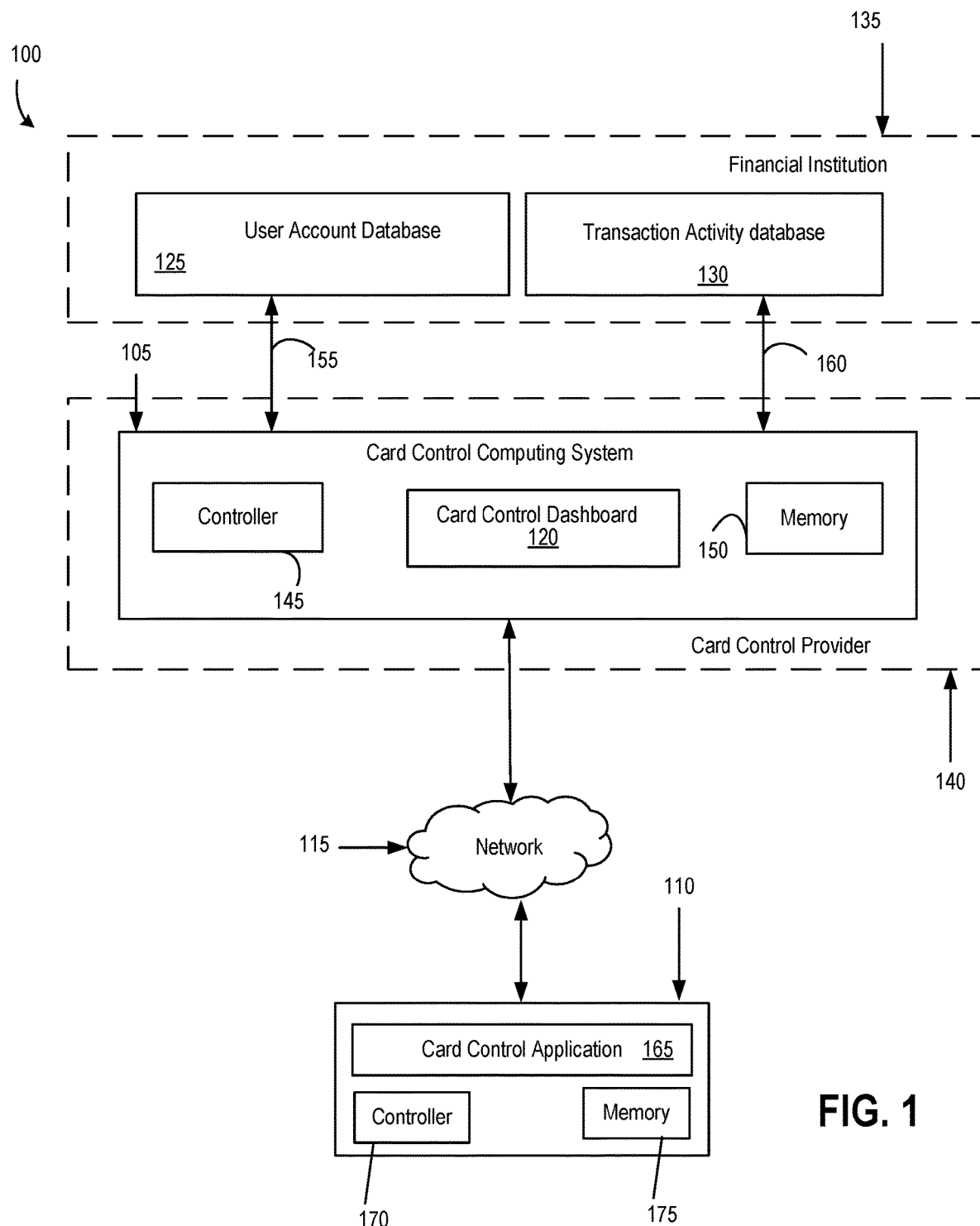
FIG. 1 is a block diagram of a card control system, in accordance with at least some embodiments of the present disclosure.

The foregoing and other features of the present disclosure will become apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

The present disclosure relates to a card control computing system configured to create a card control dashboard for a user having at least one payment card issued by a financial institution. For each payment card of the user, the card control computing system creates and stores a variety of card control rules. In various embodiments, the card control system creates the card control rules for the user automatically based on the transaction history of the user, demographic information about the user, transaction histories and/or card control rules of other user with similar transaction histories and demographics, and so on. The card control rules may pertain to merchant categories (e.g., using MCC codes) and/or to specific merchants. Based upon the card control rules, the card control computing system may allow or restrict payments made using each payment card. The card control computing system may send an alert on a user device associated with the user when one or more of the card control rules are triggered, as well as update one or more of the card control rules in real-time upon receiving an indication from the user via the user device.

For example, a user may be a student at a local university. The card control system may create card control rules for the user based on the rules of other users with similar demographics and transaction histories. The demographics may, for example, include college-aged users. The transaction histories may, for example, include transactions at merchants near the local university. As a practical matter, the card control system may create card control rules for the user based on the rules of some of the other students the local university, since some of the other students may share similar demographics (same age) and transaction histories (they shop at the same merchants) as the user. In some embodiments, the user may be provided with a card control dashboard (e.g., a tool within online banking, a tool within a mobile banking application, a tool within a mobile wallet application, a tool provided a dedicated card control application, or other arrangement) that allows the user to view all of the card control rules that have been created and that allows the user delete/edit parameters of the card control rule, as the user deems appropriate. If, for example, the local university is in a major urban area, other merchants may be in the vicinity of the university that are typically not patronized by college students, e.g., a high end antique store. Accordingly, a card control rule may be created that is triggered if there is an attempt to use the user's credit card at the high end antique dealer, since other students like the user generally do not patronize the high end antique store, even though the high end antique store is near the university. In some embodiments, when the card control rule is triggered, the triggered rule prevents the transaction from being authorized by the financial institution. In other embodiments, an alert may be sent to a device of the user (e.g., a mobile phone, a smart watch, smart eyewear, other wearable, etc.). The alert may give the user the option to confirm that they are attempting to conduct a transaction at the high end antique dealer. If in fact it is the user (and not a fraudster) that is attempting to perform the transaction, then the transaction may be authenticated by the financial institution. Further, the user may then be prompted whether the user still wishes to be alerted the next time there is an attempted transaction at the high end antique store. If the user responds that the user does not wish to be alerted, then the card control rule for the antique store may be deleted for that user. Hence, in addition to modifying the card control rules over time as the user's transaction history evolves, the card control system may also modify the card control rules directly responsive to inputs received from the user concerning the user's wishes with respect to specific ones of the card control rules. On the other hand, if in fact it is a fraudster (and not the user) that is attempting to perform the transaction, then the user would not confirm that they are attempting to conduct the transaction, and the transaction would not be authenticated.

Referring now to FIG. 1, a block diagram of a card control system 100 is shown, in accordance with at least some embodiments of the present disclosure. The card control system 100 includes a card control computing system 105 in communication with a user device 110 via a network 115. The card control computing system 105, which includes a card control dashboard 120, is also in communication with a user account database 125 and a transaction activity database 130 of a financial institution 135. In at least some embodiments, the card control computing system 105 is operated and/or maintained by a card control provider 140.

The card control provider 140 may be the same as the financial institution 135 or, in some embodiments, may be a third party that operates and manages the card control computing system 105 under control and direction of the financial institution. The financial institution 135, in turn, may be any financial institution, such as a commercial or private bank, credit union, investment brokerage entity, as well as a commercial entity capable of maintaining payment accounts on behalf of a user, including retailers, vendors, service providers, and the like. Specifically, the financial institution 135 may be any provider where the user has at least one financial account (e.g., demand deposit account, credit or debit card account, brokerage account, etc.) and that maintains the user account database 125, the transaction activity database 130, and offers a card control service to its customers as part of its product offerings. In embodiments where the financial institution 135 and the card control provider 140 are different, the computing systems of the financial institution 135 and the card control provider 140 may communicate through an API integration, for example.

The card control service of the card control system 100 allows a user to selectively permit or restrict certain types of payments made with a particular payment card using the card control dashboard 120. A "payment card," as used herein, includes credit cards, debit cards, or any other cards issued by the financial institution 135 that the user may use to make payments for purchases. In some arrangements, the payment card may be a physical payment card. In other arrangements, the payment card may be a card or other payment source that is manifested in a mobile wallet. By virtue of selectively enabling and disabling payments, the user may proactively prevent theft/fraud of the payment card. "User," as used herein, may be an individual, a business or government entity, or an agent thereof.

Users may permit or restrict payments made with a payment card using the card control dashboard 120 of the card control computing system 105. To manage the card control dashboard 120, the card control computing system 105 includes a controller 145 and a memory 150. The controller 145 is configured to allow the user to selectively permit or restrict payments from payment cards for various purchases from within the card control dashboard 120, and communicate with the user account database 125 and the transaction activity database 130. The controller 145 is also configured to create a variety of card control rules, discussed below, and to detect transactions that trigger those card control rules. The controller 145 may also be configured to send various alerts once the card control rules are triggered. The memory 150 is configured to store instructions, data, and any additional information associated with the card control dashboard 120.

Specifically, the controller 145 is configured to execute computer code or instructions to run one or more processes described in the present disclosure. The term "execution" as used herein means the process of running an application or the carrying out of an operation called for by an instruction. The instruction may be written using one or more programming, scripting, or assembly languages, or any other language that may be suitable. The controller 145 executes an instruction, meaning that it performs the operations called for by that instruction.

In some embodiments, the controller 145 is a digital signal processor (DSP), such as, a general-purpose, stand alone or embedded processor, or a specialized processing unit. The controller 145 may include single or multiple instances of processing units connected together at least indirectly and utilized in combination with one another to perform the various functions described herein. The controller 145 may be implemented in hardware, firmware, software, or any combination thereof. The controller 145 is operably coupled with the memory 150, as well as other devices and components of the card control computing system 105 to receive, send, and process information, and to control the operations of the card control dashboard 120. The memory 150, in turn, is an electronic holding place or storage space for information that is accessible by the controller 145. The memory 150 may include any of a variety of volatile and non-volatile memories that may be suitable for use within the card control computing system 105.

Additionally, the card control computing system 105 may include a variety of components and devices not shown herein. For example, the card control computing system 105, in some embodiments, may include user interfaces, transceivers, power sources, and input/output devices. The card control computing system 105 may also include switching and routing devices to facilitate communication with the user device 110 and with the user account database 125, and the transaction activity database 130. The card control computing system 105 may further include other or additional hardware, software, and firmware components that may be needed to perform the functions described in this disclosure.

The card control computing system 105 is configured to manage the card control dashboard 120 for a plurality of users of the financial institution 135. Within the card control dashboard 120, the card control computing system 105 creates a card control user profile for the user. With the card control user profile, the card control computing system 105 associates a variety of card control rules for managing payments made with payment cards issued to the user by the financial institution 135. The card control computing system 105 enables the user to edit and change the card control user profile and the card control rules at any time. The card control computing system 105 is further configured to cause presentation of the card control dashboard 120 on a display of a remote computing device having a user interface.

To create the card control user profile within the card control dashboard 120, the card control computing system 105 communicates (e.g., via the controller 145) with the user account database 125 and the transaction activity database 130 via communication links 155 and 160, respectively. The user account database 125 retrievably stores account information related to payment cards issued to the user by the financial institution 135. The user account database 125 may also store a variety of other information related to the user. For example, the user account database 125 may also store identifying information (e.g., name, address, social security number, etc.) to identify the user, authentication information (e.g., username, password, verification code, etc.) to authenticate and verify the user as a customer of the financial institution 135, financial information (e.g., account number(s), account balance(s), etc.) of other accounts that the user may hold with the financial institution, etc.

Likewise, the transaction activity database 130 retrievably stores transaction history (all debits and credits, etc.) of all the accounts held by the user, including both accounts with associated payment cards and accounts without associated payment cards (e.g., mortgage accounts, lines of credit, etc.). Although not shown, in at least some embodiments, the user account database 125 and the transaction activity database 130 may communicate with each other as well. Further, although the user account database 125 and the transaction activity database 130 have been shown in the present embodiment as separate databases, in at least some embodiments, the user account database and the transaction activity database 130 may be integrated into a single unit that is configured to perform the functions of both the user account database 125 and the transaction activity database 130. It is to be understood that, in some embodiments, the user account database 125 and the transaction activity database 130 are existing databases maintained by the financial institution 135 for its users.

Thus, the card control computing system 105 receives information about the user from both the user account database 125 and the transaction activity database 130. With the information received from the user account database 125 and the transaction activity database 130, the card control computing system 105 creates a card control user profile within the card control dashboard 120 for the user. The card control computing system 105 also makes the card control dashboard 120 available to the user for viewing and/or customizing the card control user profile, as discussed below.

In at least some embodiments, the card control computing system 105 interacts with the user via the user device 110 through the network 115. To facilitate easy communication with the user device 110, the card control computing system 105 (and the card control dashboard 120), in some embodiments, may be provided as part of a cloud-based or internet-based computing system that is configured to be accessed from an internet-connected device or system (e.g., the user device 110). Likewise, to facilitate easy access of the card control dashboard 120 and the card control user profile on the user device 110, the user may install a card control application 165 on the user device. The card control application 165 may be configured to communicate with the card control computing system 105 to access the card control dashboard 120 and the card control user profile via the network 115.

In at least some embodiments, the card control application 165 may be part of a larger online banking application or portal provided by the financial institution 135. For example, the card control application 165 may be part of a mobile banking application installed on the user device 110. As another example, the card control application 165 may be a web-based application that is maintained remotely by the financial institution 135 and that the user may access via a web browser on the user device 110. By virtue of using the card control application 165, the user may securely access the card control dashboard 120 on the card control computing system and manage (e.g., enable/disable, set alerts, etc.) payments using the user's payment cards. In at least some embodiments, the card control application 165 may be a stand-alone application provided by the financial institution 135.

Referring still to FIG. 1, the user device 110, in at least some embodiments, is a portable device associated with the user. For example, in some embodiments, the user device 110 may be a smartphone or other cellular device, wearable computing device (e.g., eyewear, a watch, bracelet, etc.), tablet, portable gaming device, or laptop. In other embodiments, the user device 110 may be another portable computing device that is configured to exchange information with the card control computing system 105 via the network 115 for performing the functions described herein. Further, to exchange information with the card control computing system 105, the user device 110 includes one or more components structured to allow the user device to process and store information, as well as to exchange information with the card control computing system 105.

For example, in addition to the card control application 165, the user device 110, in at least some embodiments, includes a controller 170 and a memory 175. Furthermore, in addition to the controller 170 and the memory 175, the user device 110, in other embodiments, may also include components such as, receivers, transmitters, cameras, keyboards, touchscreens, microphones, fingerprint scanners, displays, speakers, and other hardware, software, and associated logic that enable the user device to execute software applications, access websites, generate graphical user interfaces, and perform other operations described herein.

Thus, the user device 110 is configured to communicate with the card control computing system 105 and, particularly configured, to exchange information with the card control dashboard 120. As mentioned above, the user device 110 communicates with the card control computing system 105 and the card control dashboard 120 via the network 115. In at least some embodiments, the network 115 may be any of a variety of communication channels or interfaces that are suitable for communicating with the card control computing system 105 and the user device 110.

Figure 2:
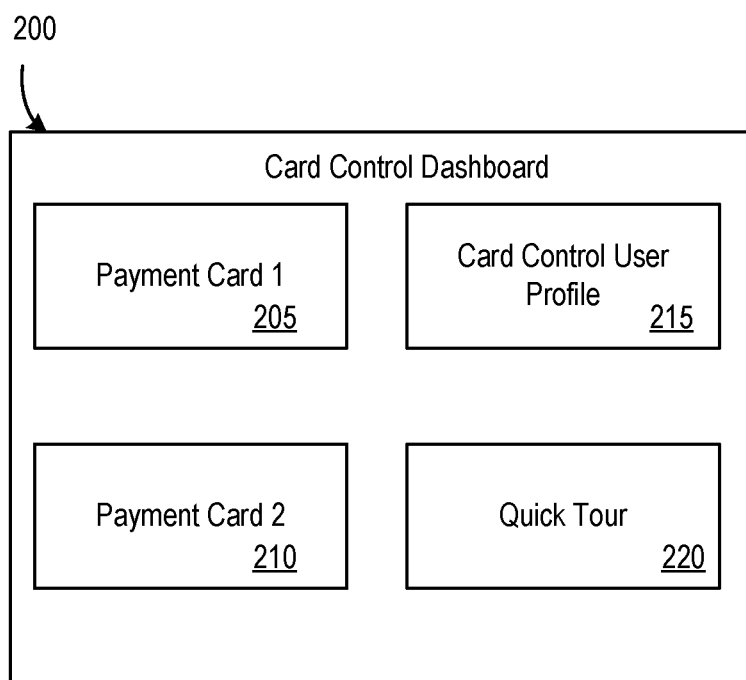
FIG. 2 is a block diagram of a card control dashboard of the card control system of FIG. 1, in accordance with at least some embodiments of the present disclosure.

Referring now to FIG. 2, as previously indicated, in some embodiments, the card control rules are automatically generated by the card control system 100 and the user is provided with a card control dashboard that hat allows the user to view all of the card control rules that have been created and that allows the user delete/edit parameters of the card control rule, as the user deems appropriate. FIG. 2 shows a card control dashboard 200 in accordance with at least some embodiments of the present disclosure. Specifically, the card control dashboard 200 provides an example interface that may presented to a user, e.g., after the user logs into a mobile banking application or a mobile wallet application. In other embodiments, the card control dashboard 200 may be provided via an online banking website. It is to be understood that only those features of the card control dashboard 200 are shown that are necessary for a proper understanding of the present disclosure. However, in other embodiments, the card control dashboard 200 may include a variety of other information related to the user, as well as any information that may be needed for a proper operation of the card control dashboard 200.

In at least some embodiments, the financial institution 135 provides the card control dashboard 200 to a user upon the user having at least one payment card with the financial institution. Specifically, the card control dashboard 200 is a feature that may be provided by the financial institution 135 as part of its on-line banking or mobile wallet services. Thus, for example, if the user has an existing payment card with the financial institution 135 or is issued a new payment card, the financial institution may provide the card control dashboard 200 as part of its services to the user.

The user is able to access the card control dashboard 120 by entering the user's authentication credentials. Such credentials may include username/password, verification codes, security question/answer, phone number, mailing address, birth date, other identifying information, or a combination thereof. Other types of authentication mechanisms may be used to access the card control dashboard 200 as well. Additionally, the authentication credentials of the card control dashboard 200 may be the same as or different from the authentication credentials of the user's on-line banking or mobile wallet credentials at the financial institution 135. In some embodiments, separate authentication to access the card control dashboard 120 may not be needed, such that by accessing the on-line banking or mobile wallet, the user is able to access the card control dashboard.

Within the card control dashboard 200, each of the payment cards held by the user (or in which the user is an authorized user) and that are issued by the financial institution 135 are listed. For example, the card control dashboard 200 shows the user as having a first payment card 205 and a second payment card 210. It is to be understood that although the card control dashboard 200 shows two payment cards, this is merely an example. Rather, in other embodiments, the card control dashboard 200 may list fewer or additional payment cards held by the user (e.g., if the user scrolls up/down or swipes left/right). Further, in at least some embodiments, each of the first payment card 205 and the second payment card 210 may be configured as a clickable link, button, or other interactive feature that the user may interact with to access additional information related to each payment card.

Thus, for example, the user may click (or otherwise interact with) the first payment card 205 to access additional information related to the first payment card, such as, account number, date the payment card was issued, transaction history, account limit, etc. Likewise, the user may interact with (e.g., click on) the second payment card 210 to access additional financial information related to that payment card. Any other information related to the payment cards that the financial institution 135 may deem useful or necessary to present to the user may also appear within areas of the interface associated with the first payment card 205 and the second payment card 210. As will be discussed further below, each of the first payment card 205 and the second payment card 210 also provides a variety of configurable card control rules that the user may use to control payment activities using those payment cards.

In addition to listing the payment cards (e.g., the first payment card 205 and the second payment card 210) held by the user, the card control dashboard 200 includes a card control user profile 215. The card control user profile 215 includes a variety of information related to the user, as discussed below. The card control user profile 215 may also have associated therewith card control rules that the user may use for managing payment with the payment cards (e.g., the first payment card 205 and the second payment card 210). Specifically, based upon the card control user profile 215, the card control computing system 105 makes card control rule recommendations for each one of the payment cards (e.g., the first payment card 205 and the second payment card 210) of the user, and associates those rules with the card control user profile. Also, in some embodiments, the card control computing system 105 makes the card control user profile 215 available to the user to further edit and personalize the card control user profile and the card control rules.

In addition to the card control user profile 215, the card control dashboard 200 may include, in some embodiments, a quick tour interface 220. The quick tour interface 220 may be a useful feature for a new user who has not used the card control service before. The quick tour interface 220 may also serve as a useful reminder of the various card control features that are offered as part of the card control service. The quick tour interface 220 may include a variety of resources such as videos, frequently asked questions, help desk, chat features, as well as other information that the financial institution 135 may deem useful for the user to have for learning about and navigating the card control dashboard 200.

Figure 3A:
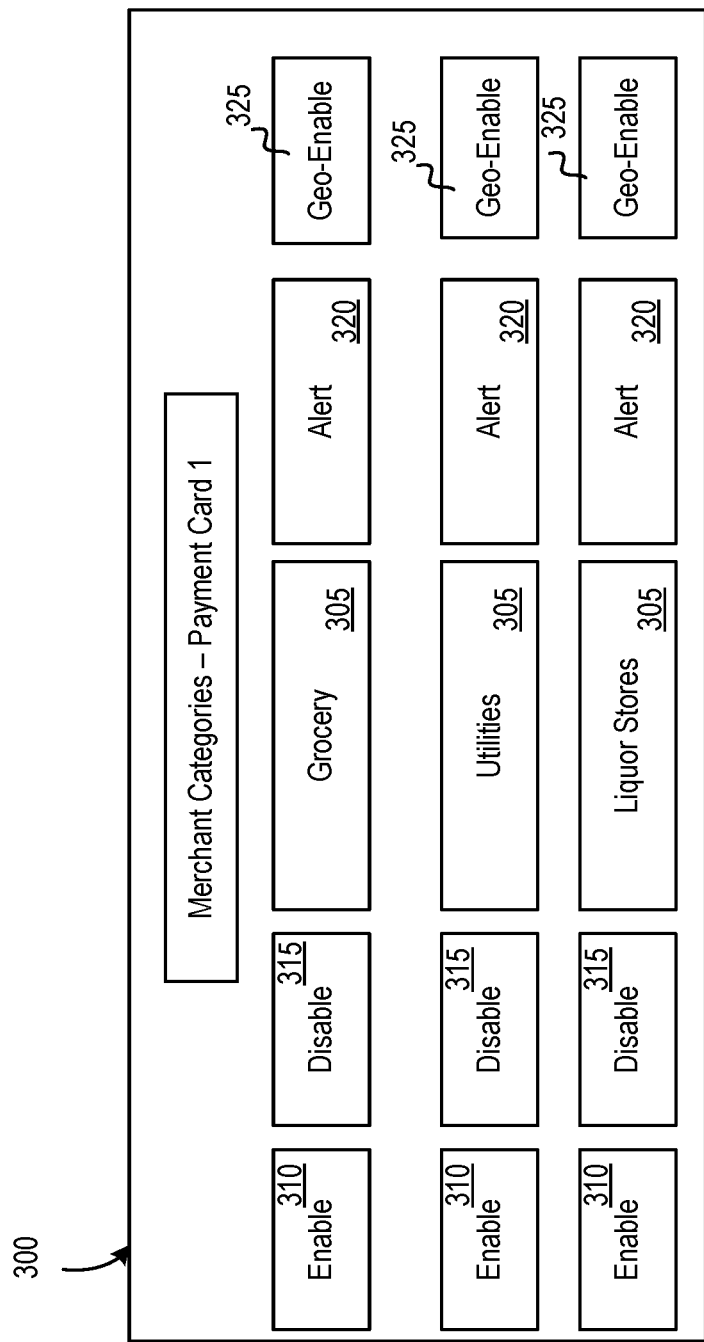
FIG. 3A is a block diagram of a first interface of the card control dashboard of FIG. 2, in accordance with at least some embodiments of the present disclosure.

Turning now to FIG. 3A, an interface 300 for the first payment card 205 within the card control dashboard 200 is shown, in accordance with at least some embodiments of the present disclosure. The interface 300 may be accessed by interacting with (e.g., clicking on) an area of the card control dashboard 200 associated with the first payment card 205. Notwithstanding the fact that the interface 300 is for the first payment card 205, a similar interface is provided for the second payment card 210. Furthermore, only those features of the interface 300 are shown that are necessary for a proper understanding of this disclosure. However, in other embodiments, several other features, such as account information related to the particular payment card may be listed as well. In some embodiments, the interface 300 may include interactive features to access other accounts of the user and features of the financial institution 135. Moreover, the size, shape, style, and arrangement of the various features on the interface 300 may vary from one embodiment to another.

The interface 300 includes, among other information, a list of card control rules 305 generated for with the first payment card 205 and organized by merchant category. As shown, the rules 305 of the first payment card 205 relate to grocery purchases, utility bills, and liquor stores. As will be appreciated, additional rules may be presented to the user (e.g., if the user scrolls up/down). It is to be understood that the rules 305 that are shown in FIG. 3A are example rule categories. The card control computing system 105 may organize the rules 305 by merchant category by using merchant category classification (MCC) codes, merchant names related to those rules, or in another manner. For example, when the user (or, alternatively, a fraudster) attempts to use a payment card (e.g., the first payment card 205) to make a payment, the financial institution 135 may receive a merchant name, MCC code, and/or other information when authorizing and completing the transaction. The card control computing system 105 may organize the rules 305 within the interface 300 on the basis of such MCC codes, merchant names or in another manner.

In some embodiments, the card control computing system 105 may provide the user with a variety of options to customize the interface 300. For example, the card control computing system 105 may allow the user to adjust font size, view the rules in paginated form versus "view-all," etc. Moreover, each of the rules 305 may be interactive features (e.g., clickable buttons) that the user may interact with to view additional details of the particular rule. For example, the user may interact with (e.g., click) the "grocery" instance of the rules 305 to see information related to the rule(s) related to grocery stores. For example, the grocery instance of the rules 305 may further have a dollar-level threshold that must be satisfied in order for a transaction to trigger the rule, and that threshold may be adjustable by the user if the user clicks on the pertinent rule.

The user may configure the card control rules to prevent fraudulent activity of the first payment card 205. Specifically, for each of the rules 305, the interface 300 allows the user to permit or restrict purchases of a specific merchant category, as well as to receive alerts on the user device 110 when the card control rules are triggered. Thus, the interface 300 provides an enable feature 310, a disable feature 315, an alert feature 320, and a geo-enable feature 325 for each of the rules 305. In other embodiments, the interface 300 may provide additional or fewer features.

The enable feature 310 and the disable feature 315, in particular, allow the user to enable or disable rules to restrict or permit purchases, respectively. Thus, the card control computing system 105 may allow the user to select (e.g., by clicking or highlighting) the enable feature 310 corresponding to one or more of the rules 305 to restrict purchases pursuant to the selected rule in the selected merchant category. Likewise, the card control computing system 105 may allow the user to select (e.g., by clicking or highlighting) the disable feature 315 corresponding to one or more of the rules 305 to at least temporarily allow purchases from the respective category of merchants. For example, if the user selects the enable feature 310 corresponding to the liquor store instance of the rules 305, then the card control computing system 105 restricts purchases at merchants that the card control computing system determines to be a liquor store based upon that merchant's name or MCC code. On the other hand, if the user selects the disable feature 315 corresponding to the liquor store instance of the rules 305, then the card control computing system 105 allows purchases at merchants that the card control computing system determines to be a liquor store based upon that merchant's name or MCC code.

It is to be understood that if the user has restricted liquor store purchases using the first payment card 205 (e.g., by selecting the enable feature 310), the card control computing system 105 may still allow the user to make purchases at the liquor store using other payment cards (e.g., with the second payment card 210) if purchases at a liquor store are enabled in those payment cards. In addition and as will be discussed below, even after disabling the first payment card 205 to make purchases of certain merchant categories (e.g., liquor store purchases), the card control computing system 105 may allow the user to at least temporarily permit purchases of those merchant categories with the first payment card 205 at a later date—either by accessing the interface 300 or upon receiving a notification on the user device 110 from the card control computing system 105 at a point-of-sale transaction.

In addition to allowing the user to permit or restrict use of a payment card (e.g., the first payment card 205) for purchasing particular merchant categories, the interface 300 also allows the user to set a variety of alerts. Thus, for each of the rules 305, the interface 300 provides the alert feature 320 to set proactive alerts when card control rules are triggered. The card control computing system 105 allows the user to interact with the alert feature 320 to set a variety of alerts. For example, the user may enable the alert feature 320 corresponding to one or more of the rules 305 to receive an alert on the user device 110 from the card control computing system 105 if the user attempts to use the first payment card 205 to make purchases of any restricted merchant categories. As a specific example, if the user has restricted liquor store purchases (e.g., by selecting the enable feature 310 corresponding to the liquor store instance of the rules 305) using the first payment card 205 and if the user has activated the corresponding instance of the alert feature 320, the user receives an alert on the user device 110 from the card control computing system 105 when the user attempts to use the first payment card to make a liquor store purchase.

The alert feature 320, in at least some embodiments, may include a variety of communication options that the card control computing system 105 may make available to the user to select from for receiving alerts. For example, in at least some embodiments, the alert feature 320 may allow the user to receive alerts via one or more of a text message on the user device 110, a phone call on the user device, an e-mail on an e-mail application installed on the user device, a social media message, etc. In other embodiments, the alert may be sent via a smart watch, wearable eyewear, or other wearable device. The card control computing system 105 may also allow the user to receive multiple forms of alerts for each restricted purchase. Once set, the card control computing system 105 allows the user to change the communication option in the alert feature 320 at any time by accessing the interface 300 of the card control dashboard 200.

Furthermore, the interface 300, in at least some embodiments, includes a geo-enable feature 325 for each of the rules 305. The geo-enable feature 325 enables the card control computing system 105 to use a global positioning system of the user device 110 to track the location of the user device and pro-actively provide an alert on the user device if the user device is at a location where purchases are restricted. In some embodiments, the card control computing system 105 may actively track the global positioning coordinates transmitted by the global positioning system of the user device 110, such that from the global positioning coordinates, the card control computing system may determine the location of the user device (e.g., via a database service that identifies merchant names based on GPS data). For example, if liquor store purchases have been restricted using the first payment card 205 and the geo-enable feature 325 corresponding to the liquor store instance of the rules 305 has been selected, the card control computing system 105 may track the global positioning co-ordinates transmitted by the user device 110 to determine whether the user device is at a liquor store. The card control dashboard 120 may send an alert (e.g., using the communication option chosen by the user in the alert feature 320) on the user device 110 notifying that purchases at a liquor store have been restricted. The user device 110 may make the alert available (e.g., on a display of the user device) for the user to view and respond. The alert may also specify further actions that the user may take to at least temporarily allow liquor store purchases using the first payment card 205.

Figure 3B:
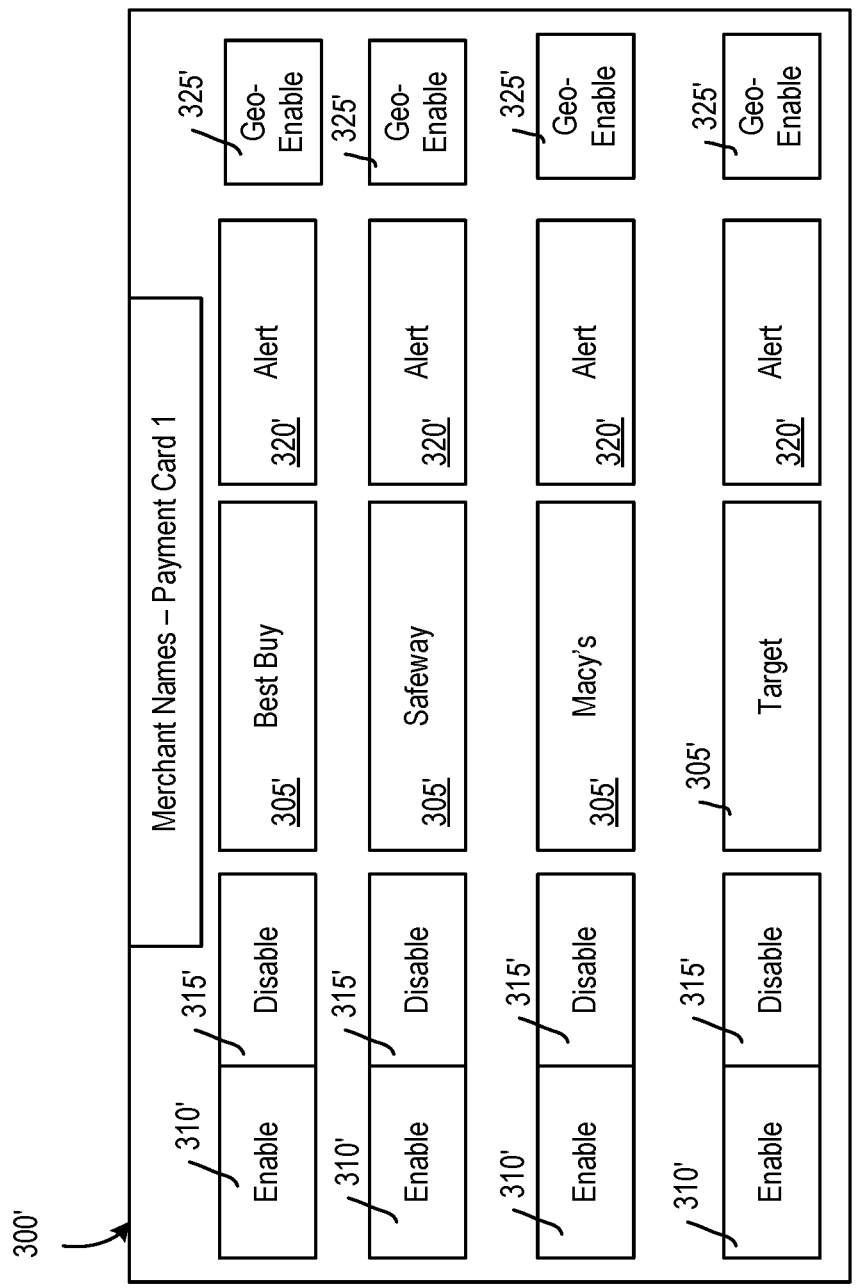
FIG. 3B is a block diagram of a second interface of the card control dashboard of FIG. 2, in accordance with at least some embodiments of the present disclosure.

Turning now to FIG. 3B, an interface 300' is shown, in accordance with at least some embodiments of the present disclosure. The interface 300' is similar to the interface 300. Similar to the interface 300, the interface 300' includes a list of rules 305', an enable feature 310', a disable feature 315', an alert feature 320', and a geo-enable feature 325'. Unlike the rules 305, which are organized by merchant category, the rules 305' are organized by merchant name.

It is to be understood that the rules 305' that are shown in FIG. 3B are only an example. In other embodiments, additional, fewer, or other rules may be listed as the rules 305'. Also, similar to the rules 305, the card control computing system 105 may provide the user ability to individually control each of the rules 305' to either allow or restrict purchases of a merchant, receive notifications on the user device 110 when using the payment card for a restricted merchant, as well as allow the card control computing system 105 to track the location of the user device using the geo-enable feature 325'.

It is to be understood that the interfaces 300 and 300' are example interfaces. Although a specific number and type of merchant categories and merchants are shown in the interfaces 300 and 300', in other embodiments, the number and type of the merchant categories and merchants may vary. Moreover, in some embodiments, the card control dashboard 200 may include either or both of the interfaces 300 and 300'. In yet other embodiments, other categorizations may be used within the card control dashboard 120.

Figure 4:
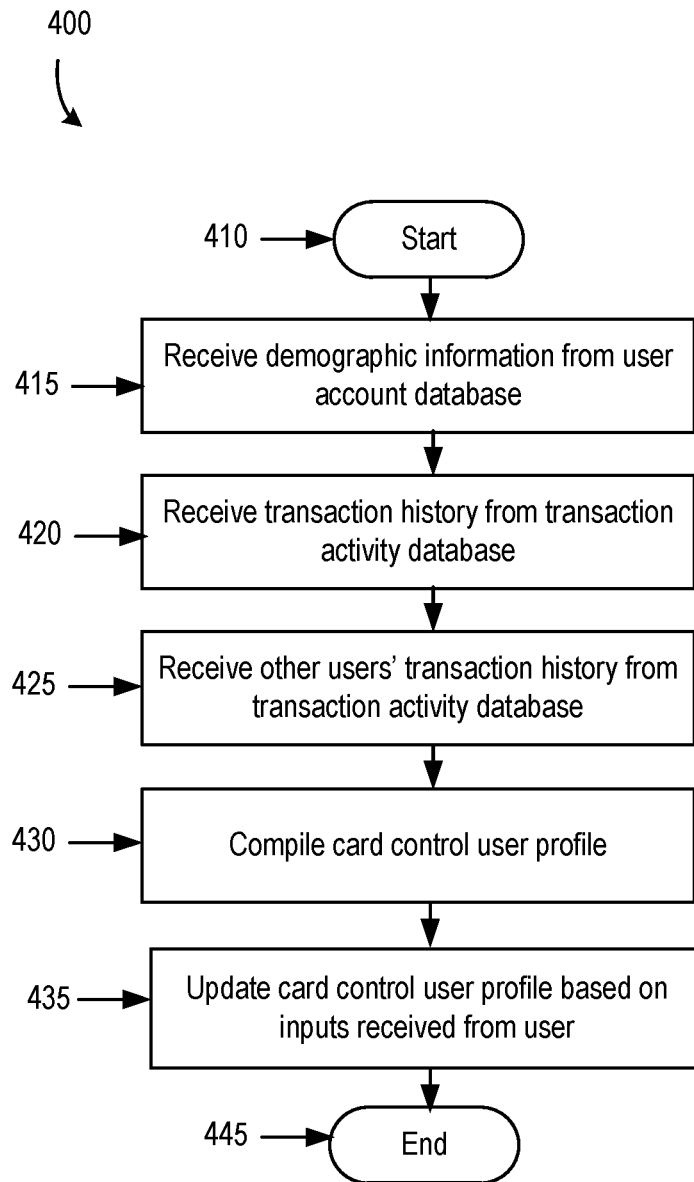
FIG. 4 is a flowchart outlining operations for creating a card control user profile for the card control dashboard of FIG. 2, in accordance with at least some embodiments of the present disclosure.

Referring now to FIG. 4, a flowchart outlining the operations of creating a card control user profile 400 is shown, in accordance with at least some embodiments of the present disclosure. As mentioned above, the card control user profile 400 is created by the card control computing system 105. The card control computing system 105 also allows a user to access and update the card control user profile through the card control dashboard 200. To create a card control user profile, after starting at operation 410, the card control computing system 105 receives demographic information about the user from the user account database 125 at an operation 415. In some embodiments, the demographic information may include the age of the user. In other embodiments, the demographic information may include additional or other information related to the user. In yet other embodiments, no demographic information may be used. Additionally, the card control computing system 105 obtains the transaction history of the user at an operation 420 from the transaction activity database 130. Specifically, the card control computing system 105 receives the transaction history of each payment card that the user account database 125 has identified for the user in the operation 410. The transaction history obtained from the transaction activity database 130 includes, in at least some embodiments, all of the purchases made by the user using a payment card, all of the purchases within a specified period of time, or another selection of purchases.

Furthermore, in at least some embodiments, at operation 425, the card control computing system 105 receives transaction histories of other customers of the financial institution 135. Based upon the information received by the card control computing system 105 at the operations 410-425, the card control computing system compiles a card control user profile for the user at operation 430. In some embodiments, the card control computing system uses clustering analysis (e.g., connectivity-based clustering (hierarchical clustering), centroid-based clustering, distribution-based clustering, density-based clustering, or other clustering techniques) to analyze the demographic information and transaction history of the user and of other customers to identify other customers that are similar to the user. In some embodiments, the clustering analysis takes into account specific merchant locations, such that the customers are determined to be similar based on conducting transactions at the same merchant locations at which the user shops.

In various embodiments, the clustering analysis may be based on various signal inputs. Examples of signal inputs that may be used include the following: customer demographics; where the customers live; where the customers work; how often the customers travel; where the customers travel; where the customers shop/spend money when they are at home, at work, or traveling; transaction sizes; transaction frequency; other customer transaction history (merchants shopped/visited, how much spent, etc.); online banking activity ("power user" vs non-"power user"); and so on.

Once of a set of similar customers is determined, the card control rules are generated based on an analysis of the transaction histories of the user and the transaction histories of the similar customers, based on an analysis of the card control rules of the similar customers, and/or in another manner. For example, in some embodiments, the card control rules are generated based on an analysis of the transaction histories of the user and the transaction histories of the similar customers. For example, for a large number of similar customers, the card control computing system 105 may identify transactions that would be out-of-pattern for the similar customers. For example, and referring to a previous example, the card control computing system 105 may identify that none (or a relatively low percentage) of the similar customers has ever conducted a transaction at a particular high end antique store, even though the antique store is located nearby for all of them. On that basis, the system may determine that a purchase at the high end antique store would be an out-of-pattern transaction, and create a card control rule for the user on this basis. However, of course, if further analysis reveals that the user has in fact conducted a transaction at the high end antique store (which would be inconsistent with the transaction patterns of the overall group of similar customers, but which would not be impossible for such a transaction to have occurred), then the card control computing system 105 may determine not to create a card control rule for that particular merchant.

As another example, the card control rules may be generated based on an analysis of the card control rules of the similar customers. For example, if a high percentage of the similar customers have a particular rule in place (e.g., a rule that is triggered when there is an attempted transaction at a high end antique store), the card control computing system 105 may add that rule to the list of rules that is being generated for the user. Again, if further analysis reveals that the user has in fact conducted a transaction at the high end antique store, then the card control computing system 105 may determine not to create a card control rule for that particular merchant.

In addition to performing cluster analysis on information (e.g., transaction history) available to the card control computing system 105, the card control computing system may receive the user's input in recommending and setting card control rules at operation 435. Specifically, when the user accesses the card control dashboard 200 for the first time, the card control computing system 105 presents a variety of questions to the user on a user interface (e.g., on a display of the user device 110) and receives responses back from the user via the user interface. For example, the card control computing system 105 may present questions to the user related to the user's spending habits, such as, merchants the user frequently shops at, merchants the user is not likely to shop at, etc. Based upon the responses, the card control computing system 105 may refine the recommended card control rules or suggest additional card control rules.

For example, if the card control computing system 105 determines from the cluster analysis and user's responses that the user is not likely to transact at a specific merchant, the card control computing system may restrict payments (e.g., by activating the disable feature 315, 315') for that merchant. Likewise, if the card control computing system 105 determines from the cluster analysis and user's responses that the user frequently transacts at a merchant location where risk of fraud is high, the card control computing system may recommend more restrictive card control rules (e.g., transactions over a threshold dollar amount need to be approved by the user via the user device). As another example, if the card control computing system 105 determines from cluster analysis and user's responses that the user does not frequently transact where risk of fraud is high, the card control computing system may recommend less restrictive card control rules.

The card control computing system 105 makes the card control rule recommendations for each payment card of the user and stores these recommended card control rules in the card control user profile of the user. Thus, the card control computing system 105 may recommend card control rules for the user based upon the user's identifying and demographic information, as well as the user's transaction history, other customers' transaction history, as well as user's responses to certain questions.

If the user is a new customer of the financial institution 135 or if the payment card of the user is the first payment card that the financial institution has issued to the user, the user is likely to not have any substantial transaction history in the transaction activity database 130. By virtue of using a variety of information (e.g., identifying information and demographic information, other customers' transaction history and user responses), the card control computing system 105 is still able to make card control rule recommendations for the user. As the user uses the payment card, the transaction history of the user is gradually built up and the card control computing system 105 may then consider the user's transaction history in making any future card control rule recommendations.

The card control computing system 105 also allows the user to further refine the card control rules directly. To update the card control user profile, the user accesses the card control dashboard 200. Within the card control dashboard 200, the card control computing system 105 allows the user to access the card control user profile 225, and update any of the fields within that profile. By virtue of modifying or updating the card control user profile (e.g., by updating the information associated with the user such as demographic information and identifying information), the user may prioritize the information that is used to generate the card control rules. In at least some embodiments, the card control computing system 105 may communicate the changes back to the user account database 125 for updating the user account database.

The card control computing system 105 also allows the user to view the card control rules that were recommended or proposed by the card control computing system. The card control computing system 105 allows the user to make any changes to those card control rules. For example, if the card control computing system 105 has allowed certain transactions, the card control computing system 105 may now allow the user to restrict those transactions by activating the enable feature 310, 310', and deactivating the disable feature 315, 315'. Likewise, the card control computing system 105 may allow the user to change alert settings in the alert feature 320, 320', and enable or disable the geo-enable feature 325, 325'. Thus, the card control computing system 105 allows the user to approve the proposed card control rules by making any modifications to those rules. The card control computing system 105 stores the changes made by the user in the card control dashboard 200.

Furthermore, in at least some embodiments, from time to time, the card control computing system 105 may recommend additional card control rules or revisions to already set card control rules based upon changes to the user's transaction history, changes in the other customers' transaction histories, or any other factors that the card control computing system may deem relevant. The card control computing system 105 may present (e.g., via a user interface of the user device 110) these additional card control rules to the user and receive a response back from the user via the user interface either accepting or rejecting the additional card control rules. In at least some embodiments, from time to time, the card control computing system 105 may seek feedback from the user regarding the card control dashboard 200 and the card control rules, and suggest changes to the card control dashboard and the card control rules based upon that feedback.

Furthermore, the card control computing system 105, in at least some embodiments, is configured to automatically apply/update the card control user profile with any changes in the financial information stored in the user account database 125 and the transaction activity database 130. For example, if a user makes a change to a payment card (e.g., user gets a new payment card number after canceling the old payment card), the card control computing system 105 may apply those changes to update the card control user profile automatically. Likewise, as the user uses the payment cards to make additional purchases, the card control computing system 105 may receive new transactions from the transaction activity database 130 and may update the card control user profile. Thus, the card control computing system 105 checks the user account database 125 and the transaction activity database 130 for changes, either continuously or periodically, and updates the card control user profile with the information received from those databases.

Figure 5:
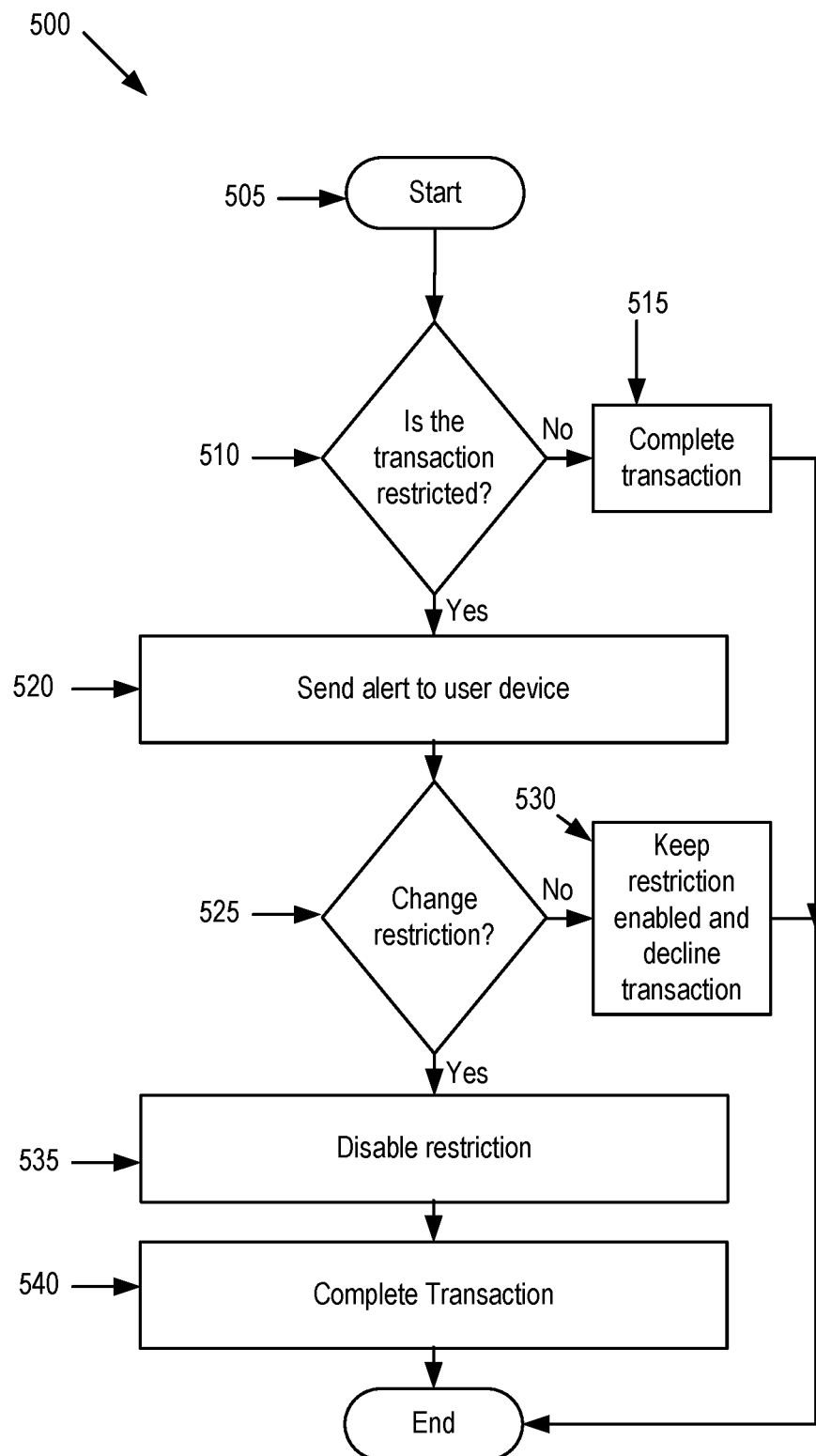
FIG. 5 is a flowchart outlining operations of using card control during a payment transaction, in accordance with at least some embodiments of the present disclosure.

Referring specifically to FIG. 5, an exemplary flowchart outlining the operations of using card control rules during a transaction 500 is shown, in accordance with at least some embodiments of the present disclosure. Specifically, the transaction 500 includes purchase at a specific merchant using a payment card for which a card control rule has been set. After starting at operation 505, the card control rules may be triggered when, at operation 510, the user attempts to make a transaction. Specifically, the card control rules are triggered when the user attempts to make a purchase (e.g., purchase of at a merchant or purchase at a merchant category) using a payment card for which a card control rule is set in the card control dashboard 200. As the user attempts to use the payment card for completing the transaction, the card control computing system 105 determines automatically, at operation 510, whether a card control rule has been set in the card control dashboard 200 for that transaction, and whether the transaction has been restricted by the card control rule (e.g., whether the card control rule has been triggered).

For example, the transaction at the operation 510 may involve the user making a purchase at a liquor store. When the user uses (e.g., by swiping, scanning, inserting into a chip slot, etc.) the payment card to complete the transaction at the liquor store, the card control computing system 105 determines whether a card control rule has been set for purchases at a liquor store in general or that specific liquor store. If the card control computing system 105 determines that a card control rule has been set, then the card control computing system determines whether the card control rule allows or restricts purchases at that liquor store. The card control computing system 105 may determine whether purchases at the liquor store are restricted or permitted by reviewing the enable and disable features 310 and 315, respectively.

If the card control computing system 105 determines at the operation 510 that the card control rule allows purchases at the liquor store (e.g., if the disable feature 315 is selected) or if no card control rule has been set, the card control computing system allows the transaction to go through at operation 515. The user is, thus, able to make purchases at the liquor store using the payment card.

On the other hand, if at the operation 510, the card control computing system 105 determines that the card control rule has, in fact, restricted purchases at the liquor store (e.g., if the enable feature 310 is selected) in the card control dashboard 200, the card control computing system prevents (at least temporarily) the user from completing the transaction. Specifically, the card control computing system 105 may deny (or not approve) the transaction of making purchases at the liquor store using that payment card. In at least some embodiments, the card control computing system 105 may itself not have the ability to approve or deny transactions, but may be able to communicate with the financial institution 135 to deny a specific transaction, for example, via an application programming interface ("API").

In addition to denying the transaction, the card control computing system 105 sends a notification on the user device 110 to alert (and remind) the user of the restriction set in the card control rule at operation 520. The card control computing system 105 sends the notification using the mode of communication that has been selected in the alert feature 320. For example, if the mode of communication is set as "text" in the alert feature 320, the card control computing system 105 sends a text message on the user device 110. The user may view the alert on the user device 110 (e.g., on a display of the user device).

If the user views the notification on the user device 110, the user is able to either confirm the restriction (e.g., keep the restriction ON) or disable the restriction (e.g., turn the restriction OFF) at operation 525 by interacting with the alert on the user device 110. Specifically, if the card control computing system 105 receives a response back from the user device 110 confirming the restriction or if the card control computing system does not get a response back within a certain period of time, then at operation 530, the card control computing system does not change the card control rule. Thus, the restriction for making purchases at the liquor store remains enabled and the card control computing system 105 prevents the user from using that payment card at the liquor store.

On the other hand, if at the operation 525 the card control computing system 105 receives a response back from the user device 110 requesting to disable the restriction (e.g., to allow purchases at the liquor store), the card control computing system activates the disable feature 315, and deactivates the enable feature 310 in the card control dashboard 200 at operation 535 to allow the user to make purchases at the liquor store at operation 540.

In at least some embodiments, the user is able to request a change in the card control rule from within the alert itself that the user device 110 receives at the operation 525. The alert may include directions for the user to respond to change the card control rule. For example, if the card control computing system 105 notifies the user using text, the text message may instruct the user to respond with, for example, "Y" or "Yes" to disable the restriction on buying liquor and with "N" or "No" to keep the restriction enabled. The alert may also provide the user an option to either change the card control rule temporarily (e.g., for just the current transaction, for a specific number of transactions, specific period of time, etc.), or change the card control rule permanently until the card control rule is changed again.

Therefore, the user may interact with the alert on the user device 110 to send a response to the card control computing system 105 to either change the card control rule or keep the card control rule unchanged. If the card control computing system 105 receives a response from the user via the user device 110 to change the card control rule for only the current transaction, the card control computing system activates the enable feature 310 on the user's card control dashboard 200 and allows the user to complete the transaction at the liquor store using the payment card for just the current transaction. The card control computing system 105 changes the card control rule back to the original setting by deactivating the enable feature 310 and activating the disable feature 315 once the card control computing system determines that the user has completed the current transaction. Thus, the card control computing system 105 is able to control transactions and update card control rules in real-time based upon input from the user received via the user device 110.

Hence, in various embodiments, the user is provided with the ability to enable or disable the card control rule at different times. For example, in the context of FIGS. 2, 3A, and 3B, the user is provided with the ability to enable/disable the card control rule for all transactions. In the context of operation 525, the user is provided with the ability to enable/disable the card control rule for purposes of a single transaction. As yet another example, the user (suspecting that the he/she is about to attempt to conduct a transaction that will trigger one or more card control rules) may be provided with the ability to provide inputs to disable all card control rules for a predetermined period of time (e.g., the next ten minutes). As yet another example, the user (suspecting that the he/she may have lost their credit card) may be provided with the ability to provide inputs to enable all card control rules, even card control rules previously disabled, for a predetermined period of time (e.g., the next ten days), until the user either finds the user's credit card or decides that the credit card has been permanently lost.

Figure 6:
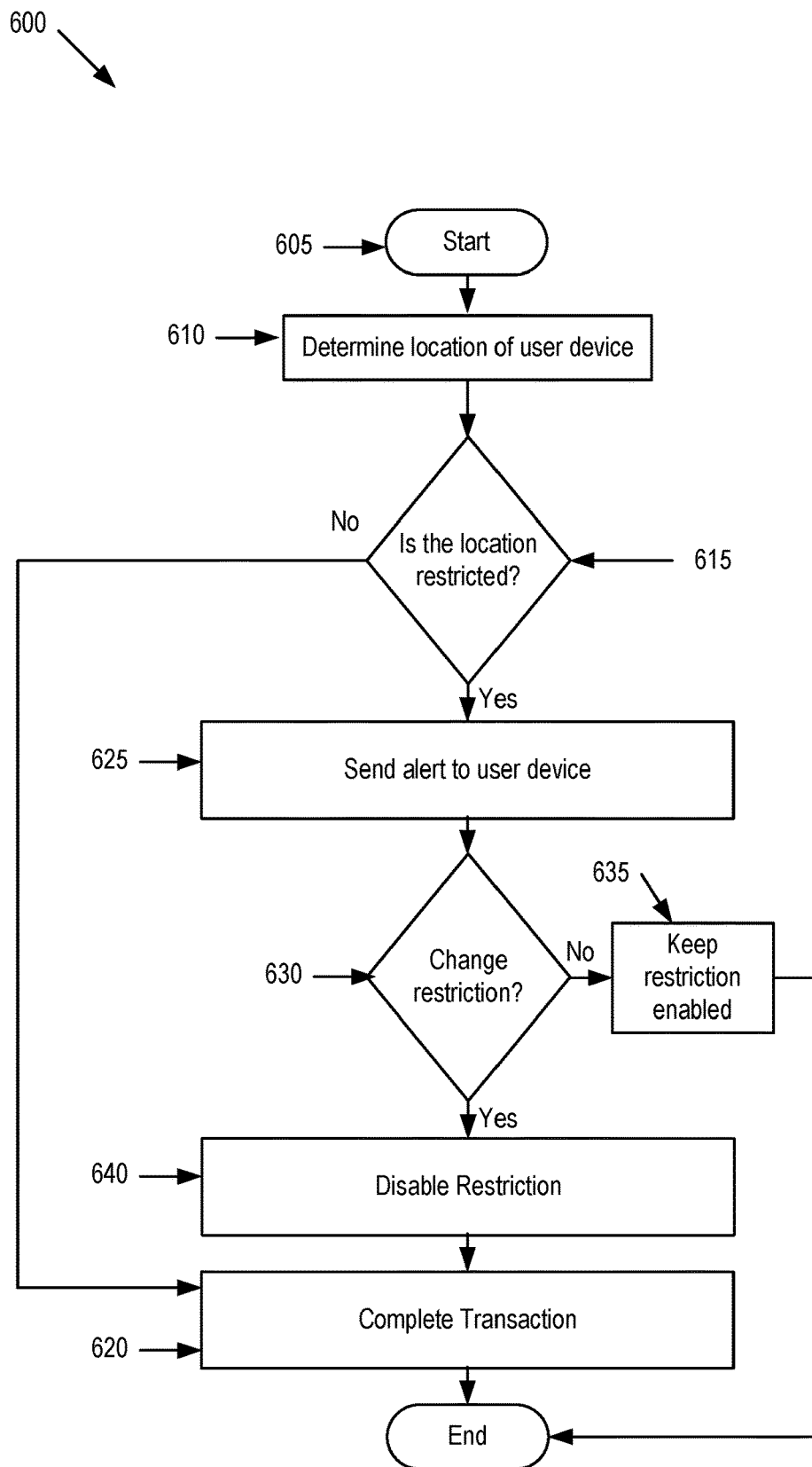
FIG. 6 is a flowchart outlining operations of using card control based on a user's location, in accordance with at least some embodiments of the present disclosure.

Turning now to FIG. 6, a flowchart outlining operations of another transaction 600 is shown, in accordance with at least some embodiments of the present disclosure. Specifically, the transaction 600 utilizes the geo-enable feature 325, 325' of the card control dashboard 200.

As part of the card control rules, the card control computing system 105 activates the geo-enable feature 325, 325' at operation 610. By virtue of enabling the geo-enable feature 325, 325', the card control computing system 105 is able to receive a location of the user device 110. It is to be understood that the geo-enable feature 325, 325' is able to receive the location of the user device 110 if the global positioning feature of the user device 110 is enabled and the user device is transmitting the location of the user device. If the geo-enable feature 325, 325' is selected, but the card control computing system 105 is not able to receive the location data of the user device 110, in at least some embodiments, the card control computing system may send a notification (e.g., using the user's preferred mode of communication as set in the user profile 225) on the user device to alert the user to turn on the global positioning feature of the user device.

Once the geo-enable feature 325, 325' is selected and receiving the location of the user device 110, the card control computing system 105 continuously tracks the location of the user device at operation 615. The card control computing system 105 assumes that the user is carrying the user device 110 at all times (or at least when the transaction 600 is occurring). Based upon the location of the user device 110, the card control computing system 105 determines the location of the user. Based upon the location of the user, the card control computing system 105 determines, at the operation 615, whether that location is of a restricted merchant (e.g., whether a card control rule restricts purchases from that merchant).

For example, if the user is at a liquor store, the user device 110 automatically transmits the location of the user device. Since the geo-enable feature 325' is activated, the card control computing system 105 receives the location information from the user device 110, and automatically reviews the card control dashboard 200 of the user to determine if that particular location has a card control rule. It is to be understood that if the geo-enable feature 325' is not activated, then the card control computing system cannot determine the location of the user device 110 even if the user device is transmitting the location of the user. In those cases, the card control computing system 105 waits for the user to use the payment card, as described in FIG. 5 above.

If the geo-enable feature 325' is selected, the card control computing system 105 receives the location of the user device 110 and determines if purchases from that location are restricted. If the card control computing system 105 determines that purchases from the location of the user device 110 are not restricted, then the card control computing system does not generate any alerts. The card control computing system 105 allows the transactions to go through and the process ends at operation 620.

On the other hand, if at the operation 615, the card control computing system 105 determines that the user device 110 is at a restricted location (e.g., location where purchases are restricted), the card control computing system generates an alert at operation 625. The card control computing system 105 sends the alert to the user device 110. The user may view the alert on a user interface (e.g., display) of the user device 110. The alert notifies the user of the restricted location, and provides directions to the user if the user desires to change the card control rule (e.g., allow purchases at that location) at operation 630. The alert also presents options to the user to change the card control rule either temporarily or permanently. If the card control computing system 105 receives a response back from the user via the user device 110 to keep the restriction enabled, at operation 635, the card control computing system prevents the user from making purchases at that location using the payment card associated with the restricted location.

If the card control computing system 105 receives a response back from the user via the user device 110 to disable the restriction, the card control computing system 105 deactivates the enable feature 310', and allows the user to make purchases from that location at operation 640. By virtue of tracking the location of the user device 110, the card control computing system 105 is able to present any restrictions on the user device 110 for the user to view and respond. The card control computing system 105 is also able to pro-actively notify the user (via the user device 110) of the restrictions before the user approaches the check-out counter, thereby allowing the transaction to go quicker.

Thus, the card control computing system 105 works in the background to keep track of the card control rules in the card control dashboard 200, and monitors the user's transactions that may trigger card control rules. By using the card control rules, the card control computing system 105 prevents unauthorized use of the payment card pro-actively before unauthorized transactions take place and enables a user to be in control of how his/her payment card is used.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

Pt should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:
1. A system, comprising:
a card control computing system comprising:
a memory unit coupled to a processing unit and storing instructions that, when executed by the processing unit, cause the processing unit to:
receive, from a user account database, information associated with a user of a payment card;
identify and authenticate the user based on the information associated with the user;

identify, based on a transaction history of the user and transaction histories of other users, a subset of other users having common transactions with the user;

identify one or more card control rules of the subset of other users for determining whether to allow or restrict transactions associated with the payment card, the subset of other users identified based on a clustering analysis, the one or more card control rules including a first card control rule to restrict out-of-pattern transactions at a merchant;

determine, based on the transaction history of the user including at least one historical transaction at the merchant, that the transaction history of the user is inconsistent with the transaction histories of the subset of other users;

automatically create without user input, based upon the transaction history associated with the user and based upon the transaction histories of the subset of other users accessible to the card control computing system, a card control user profile comprising a second card control rule of the one or more card control rules of the subset of other users for determining whether to allow or restrict transactions associated with the payment card, wherein the card control user profile does not include the first card control rule to restrict out-of-pattern transactions at the merchant;

present, in a card control dashboard, (i) a tour interface comprising information about navigating the card control dashboard, and (ii) a user interface comprising information associated with the card control user profile and the second card control rule, and (iii) user activity queries corresponding to use of the payment card;

receive, via the card control dashboard, selections from the user to update the card control user profile and the second card control rule in response to the user activity queries;

modify the card control user profile based upon the selections received via the card control dashboard;

responsive to the selections, automatically modify the second card control rule of the card control user profile;

track global positioning coordinates of a user device that is associated with the card control user profile;

determine that the user is attempting a current transaction with the payment card;

determine that the current transaction violates the modified second card control rule based on the global positioning coordinates of the user device being used to make the current transaction using the payment card; and in response to determining that the current transaction violates the modified second card control rule, send an alert to the user device to indicate the current transaction violates the modified second card control rule.

2. The system of claim 1, wherein the information associated with the user includes user-submitted information responsive to questions presented to the user via the card control dashboard.

3. The system of claim 1, wherein the transaction history of the user is of the payment card within a specified period of time.

4. The system of claim 3, wherein the processing unit is further configured to classify the transaction history based upon a plurality of transaction types.

5. The system of claim 4, wherein the plurality of transaction types includes a product category.

6. The system of claim 1, wherein the information associated with the user includes demographic information of the user.

7. The system of claim 1, wherein a third card control rule of the card control user profile associated with a first merchant is more restrictive than a fourth card control rule of the card control user profile associated with a second merchant based on a determination that the user transacts at the first merchant having a risk of fraud that is higher than a risk of fraud associated with the second merchant.

8. The system of claim 1, wherein the information associated with the user includes information of at least one other customer of a card control provider of the payment card.

9. The system of claim 1, wherein the selections to modify the card control user profile comprises modifying a subset of the information associated with the user.

10. The system of claim 1, wherein the processing unit is further configured to display the card control user profile on the user device.

11. The system of claim 1, wherein the processing unit is further configured to receive updated information related to the information associated with the user, and wherein the processing unit is further configured to update the card control user profile based on the updated information.

12. A method, comprising:

receiving, by a card control computing system from a user account database, information associated with a user of a payment card;

identifying and authenticating, by the card control computing system, the user based on the information associated with the user;

identifying, by the card control computing system, based on a transaction history of the user and transaction histories of other users, a subset of other users having common transactions with the user;

identifying, by the card control computing system, one or more card control rules of the subset of other users for determining whether to allow or restrict transactions associated with the payment card, the subset of other users identified based on a clustering analysis, the one or more card control rules including a first card control rule configured to restrict out-of-pattern transactions at a merchant;

determining, based on the transaction history of the user including at least one historical transaction at the merchant, that the transaction history of the user is inconsistent with the transaction histories of the subset of other users;

automatically creating without user input, by the card control computing system, based upon the transaction history associated with the user and upon the transaction histories of the subset of other users accessible to the card control computing system, a card control user profile comprising a second card control rule of the one or more card control rules of the subset of other users for determining whether to allow or restrict transactions associated with the payment card, wherein the card control user profile excludes the first card control rule to restrict out-of-pattern transactions at the merchant;

presenting, by the card control computing system, in a card control dashboard, (i) a tour interface comprising information about navigating the card control dashboard, and (ii) a user interface comprising information associated with the card control user profile and the second card control rule, and (iii) user activity queries corresponding to use of the payment card;

receiving, by the card control computing system, via the card control dashboard, a selection from the user to update the card control user profile and the second card control rule in response to the user activity queries;

modifying, by the card control computing system, the card control user profile based upon the selection received via the card control dashboard;

responsive to the selection, automatically modifying, by the card control computing system, the second card control rule of the card control user profile;

tracking global positioning coordinates of a user device that is associated with the card control user profile;

determining that the user is attempting a current transaction with the payment card;

determining that the current transaction violates the modified second card control rule based on the global positioning coordinates of the user device being used to make the current transaction using the payment card; and in response to determining that the current transaction violates the modified second card control rule, sending an alert to the user device to indicate the current transaction violates the modified second card control rule.

13. The method of claim 12, wherein receiving the transaction history comprises:
receiving, by the card control computing system, the transaction history of the payment card for a specified period of time; and
classifying, by the card control computing system, transactions in the transaction history by a plurality of transaction types, wherein the plurality of transaction types comprises a merchant category.

14. The method of claim 12, wherein a third card control rule of the card control user profile associated with a first merchant is more restrictive than a fourth card control rule of the card control user profile associated with a second merchant based on a determination that the user transacts at the first merchant having a risk of fraud that is higher than a risk of fraud associated with the second merchant.

15. The system of claim 1, wherein the processing unit is further configured to:
present, in the card control dashboard, the second card control rule and a geo-enable feature and an alert feature; and
accept, via the card control dashboard, a first user selection to geo-enable the second card control rule, and a user second selection to enable alerts for the second card control rule, wherein determining that the transaction violates the modified second card control rule comprises determining that the transaction violates the geo-enabled and alert-enabled modified second card control rule.

16. The method of claim 12, further comprising:
presenting, by the card control computing system, in the card control dashboard, the second card control rule and a geo-enable feature and an alert feature;
accepting, by the card control computing system, via the card control dashboard, a first user selection to geo-enable the second card control rule, and a user second selection to enable alerts for the second card control rule; and
wherein determining that the transaction violates the modified second card control rule based on global positioning coordinates comprises determining that the second card control rule is geo-enabled and, responsive to determining that the second card control rule is geo-enabled, determining that the transaction violates the second card control rule, and
wherein sending the alert to the user device is further responsive to determining that the second card control rule is alert-enabled.

17. The system of claim 1, wherein the processing unit is further configured to select the second card control rule for the card control user profile responsive to identifying that a percentage of the subset of other users associated with the second card control rule satisfies a predetermined threshold.

18. The system of claim 1, wherein the processing unit is further configured to:
identify, from transaction data regarding previous transactions associated with the payment card, a second transaction associated with the payment card; and
create a third card control rule for the card control user profile responsive to identifying that a percentage of the subset of other users associated with the second transaction satisfies a predetermined threshold.

19. The method of claim 12, further comprising selecting, by the card control computing system, the second card control rule for the card control user profile responsive to identifying that a percentage of the subset of other users associated with the second card control rule satisfies a predetermined threshold.

20. The method of claim 12, further comprising:
identify, from transaction data regarding previous transactions associated with the payment card, a second transaction associated with the payment card; and
create a third card control rule for the card control user profile responsive to identifying that a percentage of the subset of other users associated with the second transaction satisfies a predetermined threshold.

* * * * *